(12) United States Patent
Chen et al.

(10) Patent No.: US 11,457,253 B2
(45) Date of Patent: *Sep. 27, 2022

(54) APPARATUS AND METHODS FOR PRESENTATION OF KEY FRAMES IN ENCRYPTED CONTENT

(71) Applicant: Time Warner Cable Enterprises LLC, St. Louis, MO (US)

(72) Inventors: John Chen, Ashburn, VA (US); David Belt, Fort Colins, CO (US); Edward Galt, III, Boulder, CO (US); Robert Todd Smith, Boulder, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/872,060

(22) Filed: May 11, 2020

(65) Prior Publication Data

US 2020/0314461 A1 Oct. 1, 2020

Related U.S. Application Data

(62) Division of application No. 15/204,610, filed on Jul. 7, 2016, now Pat. No. 10,652,594.

(51) Int. Cl.
*H04N 21/2347* (2011.01)
*H04N 21/2662* (2011.01)
(Continued)

(52) U.S. Cl.
CPC ....... *H04N 21/2347* (2013.01); *H04L 65/612* (2022.05); *H04L 65/70* (2022.05);
(Continued)

(58) Field of Classification Search
CPC ........... H04N 21/2347; H04N 21/2541; H04N 21/2662; H04L 65/4084; H04L 65/602;
(Continued)

(56) References Cited

U.S. PATENT DOCUMENTS 4,195,351 A 3/1980 Barner et al.
6,275,618 B1 8/2001 Kodama
(Continued)

FOREIGN PATENT DOCUMENTS

EP 3120565 A2 1/2017
EP 3687175 A1 7/2020
(Continued)

OTHER PUBLICATIONS

Zhang et al., "Implementing hierarchical trick play for HTTP video streaming", IEEE, doi: 10.1109/GLOCOMW.2010.5700363, 2010, pp. 465-468. (Year: 2010).*

(Continued)

*Primary Examiner* — Peter C Shaw
(74) *Attorney, Agent, or Firm* — Patent Beach PC

(57) ABSTRACT

Apparatus and methods for presentation of key frames. In one embodiment, an encoded video file is generated where one or more bits are assigned to key frames and minimizes the number of bits assigned to delta frames. Each key frame may be presented to a user during trick mode operation (e.g., fast forward, rewind, pause, or random seek operation). When the encoded video file is given to a packager, the packager generates a manifest file listing the byte information (byte offset and number of bytes) for each key frame in the encoded video file. When a user inputs a trick play mode command, the packager provides the manifest file to the client device of the user and the client device requests the bytes for the key frames of the video file from the content delivery network.

20 Claims, 11 Drawing Sheets

(51) Int. Cl.
*H04N 21/254* (2011.01)
*H04L 65/70* (2022.01)
*H04L 65/612* (2022.01)
*H04L 65/75* (2022.01)

(52) U.S. Cl.
CPC ....... *H04L 65/762* (2022.05); *H04N 21/2541* (2013.01); *H04N 21/2662* (2013.01)

(58) Field of Classification Search
CPC ..... H04L 65/607; H04L 65/70; H04L 65/762; H04L 65/612
USPC ....................................................... 380/210
See application file for complete search history.

(56) References Cited

U.S. PATENT DOCUMENTS

| | | | |
|---|---|---|---|
| 6,636,238 B1 | 10/2003 | Amir et al. | |
| 7,031,348 B1 | 4/2006 | Gazit | |
| 7,602,820 B2 | 10/2009 | Helms et al. | |
| 7,725,557 B2 | 5/2010 | Klemets et al. | |
| 7,954,131 B2 | 5/2011 | Cholas et al. | |
| 8,213,358 B1 | 7/2012 | Goyal et al. | |
| 8,484,511 B2 | 7/2013 | Engel et al. | |
| 8,520,850 B2 | 8/2013 | Helms et al. | |
| 8,521,002 B2 | 8/2013 | Yahata et al. | |
| 8,613,089 B1 | 12/2013 | Holloway et al. | |
| 8,621,540 B2 | 12/2013 | Apsangi et al. | |
| 8,660,181 B2 | 2/2014 | Streater et al. | |
| 8,713,623 B2 | 4/2014 | Brooks | |
| 8,799,943 B1 | 8/2014 | Sherwin et al. | |
| 8,813,124 B2 | 8/2014 | Tidwell et al. | |
| 8,813,127 B2 | 8/2014 | Liu et al. | |
| 8,826,347 B1 | 9/2014 | Earle | |
| 8,863,164 B1 | 10/2014 | Mick et al. | |
| 8,917,977 B2 | 12/2014 | Hamada et al. | |
| 8,924,580 B2 | 12/2014 | Begen et al. | |
| 8,930,979 B2 | 1/2015 | Tidwell et al. | |
| 8,997,136 B2 | 3/2015 | Brooks et al. | |
| 9,066,115 B1 | 6/2015 | Cherry et al. | |
| 9,066,138 B1 | 6/2015 | Kraiman et al. | |
| 9,083,513 B2 | 7/2015 | Helms et al. | |
| 9,170,700 B2 | 10/2015 | Kaiser et al. | |
| 9,215,423 B2 | 12/2015 | Kimble et al. | |
| 9,247,317 B2* | 1/2016 | Shivadas | H04N 21/23439 |
| 9,710,469 B2 | 7/2017 | Chen et al. | |
| 10,375,452 B2 | 8/2019 | Hardin et al. | |
| 11,089,373 B2 | 8/2021 | Chittella et al. | |
| 2002/0135621 A1 | 9/2002 | Angiulo et al. | |
| 2002/0154694 A1 | 10/2002 | Birch | |
| 2002/0164149 A1 | 11/2002 | Wilkinson | |
| 2002/0172281 A1 | 11/2002 | Mantchala et al. | |
| 2003/0056217 A1 | 3/2003 | Brooks | |
| 2003/0067877 A1 | 4/2003 | Sivakumar et al. | |
| 2003/0071971 A1* | 4/2003 | Jo | G11B 27/327 |
| | | | 386/E5.052 |
| 2003/0235396 A1 | 12/2003 | Boston et al. | |
| 2004/0081333 A1 | 4/2004 | Grab et al. | |
| 2005/0123381 A1 | 6/2005 | Weeden et al. | |
| 2005/0210145 A1 | 9/2005 | Kim et al. | |
| 2005/0262529 A1* | 11/2005 | Neogi | H04N 21/63345 |
| | | | 725/31 |
| 2006/0025869 A1 | 2/2006 | Virdi et al. | |
| 2006/0130113 A1 | 6/2006 | Carlucci et al. | |
| 2006/0161563 A1 | 7/2006 | Besbris et al. | |
| 2006/0225118 A1 | 10/2006 | Rolls et al. | |
| 2007/0058926 A1 | 3/2007 | Virdi et al. | |
| 2007/0136742 A1 | 6/2007 | Sparrell | |
| 2007/0237225 A1 | 10/2007 | Luo et al. | |
| 2007/0253699 A1 | 11/2007 | Yen et al. | |
| 2008/0015999 A1 | 1/2008 | Ali et al. | |
| 2008/0077866 A1 | 3/2008 | Margulis | |
| 2008/0104644 A1* | 5/2008 | Sato | H04N 21/2381 |
| | | | 386/346 |
| 2008/0168133 A1* | 7/2008 | Osborne | H04N 5/76 |
| | | | 709/203 |
| 2008/0181575 A1 | 7/2008 | Girard et al. | |
| 2008/0205644 A1* | 8/2008 | Lee | H04N 21/8456 |
| | | | 380/210 |
| 2008/0235351 A1* | 9/2008 | Banga | G06Q 30/02 |
| | | | 709/218 |
| 2008/0235746 A1 | 9/2008 | Peters et al. | |
| 2008/0273858 A1* | 11/2008 | Wald | H04N 5/76 |
| | | | 386/E5.028 |
| 2008/0276173 A1 | 11/2008 | Li et al. | |
| 2008/0313691 A1 | 12/2008 | Cholas et al. | |
| 2009/0079840 A1 | 3/2009 | Gandhi et al. | |
| 2009/0150557 A1 | 6/2009 | Wormley et al. | |
| 2009/0165067 A1 | 6/2009 | Bruckman et al. | |
| 2009/0190652 A1 | 7/2009 | Kim et al. | |
| 2010/0135382 A1* | 6/2010 | Kim | H04N 5/783 |
| | | | 348/739 |
| 2010/0175088 A1 | 7/2010 | Loebig et al. | |
| 2010/0251304 A1 | 9/2010 | Donoghue et al. | |
| 2010/0251305 A1 | 9/2010 | Kimble et al. | |
| 2011/0016482 A1 | 1/2011 | Tidwell et al. | |
| 2011/0050860 A1 | 3/2011 | Watson | |
| 2011/0067049 A1 | 3/2011 | Piepenbrink et al. | |
| 2011/0080940 A1 | 4/2011 | Bocharov et al. | |
| 2011/0103374 A1 | 5/2011 | Lajoie et al. | |
| 2011/0110515 A1 | 5/2011 | Tidwell et al. | |
| 2011/0138019 A1 | 6/2011 | Bae et al. | |
| 2011/0283311 A1 | 11/2011 | Luong | |
| 2012/0011225 A1 | 1/2012 | Keum et al. | |
| 2012/0030314 A1 | 2/2012 | Kim et al. | |
| 2012/0030723 A1 | 2/2012 | Baum et al. | |
| 2012/0036537 A1 | 2/2012 | Klappert et al. | |
| 2012/0047542 A1 | 2/2012 | Lewis et al. | |
| 2012/0173751 A1* | 7/2012 | Braness | H04N 21/8456 |
| | | | 709/231 |
| 2012/0179834 A1* | 7/2012 | van der Schaar | H04N 19/30 |
| | | | 709/231 |
| 2012/0185905 A1 | 7/2012 | Kelley et al. | |
| 2012/0210216 A1 | 8/2012 | Hurst | |
| 2013/0019273 A1 | 1/2013 | Ma et al. | |
| 2013/0046849 A1 | 2/2013 | Wolf et al. | |
| 2013/0060958 A1 | 3/2013 | Keum et al. | |
| 2013/0061045 A1* | 3/2013 | Kiefer | H04L 9/0819 |
| | | | 713/160 |
| 2013/0067052 A1 | 3/2013 | Reynolds et al. | |
| 2013/0104162 A1 | 4/2013 | Helms et al. | |
| 2013/0111517 A1 | 5/2013 | Dillon et al. | |
| 2013/0166690 A1* | 6/2013 | Shatzkamer | H04N 21/4331 |
| | | | 709/219 |
| 2013/0246643 A1 | 9/2013 | Luby et al. | |
| 2013/0276022 A1 | 10/2013 | Tidwell | |
| 2013/0282876 A1 | 10/2013 | Watanabe et al. | |
| 2013/0318629 A1 | 11/2013 | Lajoie et al. | |
| 2013/0346766 A1 | 12/2013 | Tani | |
| 2014/0013349 A1 | 1/2014 | Millar et al. | |
| 2014/0040026 A1 | 2/2014 | Swaminathan et al. | |
| 2014/0108585 A1 | 4/2014 | Barton et al. | |
| 2014/0119195 A1 | 5/2014 | Tofighbakhsh et al. | |
| 2014/0164760 A1 | 6/2014 | Hybertson et al. | |
| 2014/0189743 A1 | 7/2014 | Kennedy et al. | |
| 2014/0237520 A1 | 8/2014 | Rothschild et al. | |
| 2014/0245346 A1 | 8/2014 | Cheng et al. | |
| 2014/0355624 A1 | 12/2014 | Li et al. | |
| 2015/0006752 A1 | 1/2015 | O'Hare et al. | |
| 2015/0089557 A1 | 3/2015 | Busse et al. | |
| 2015/0092837 A1 | 4/2015 | Chen et al. | |
| 2015/0095460 A1 | 4/2015 | Berger et al. | |
| 2015/0095511 A1 | 4/2015 | McGowan et al. | |
| 2015/0127845 A1 | 5/2015 | Phillips et al. | |
| 2015/0180924 A1* | 6/2015 | O'Callaghan | H04L 65/765 |
| | | | 709/219 |
| 2015/0188974 A1 | 7/2015 | Garcia-Mendoza Sanchez et al. | |
| 2015/0256843 A1 | 9/2015 | Roskowski | |
| 2015/0261600 A1 | 9/2015 | Iturralde et al. | |
| 2015/0271234 A1 | 9/2015 | O'Malley et al. | |
| 2015/0271541 A1 | 9/2015 | Gonder et al. | |

(56) References Cited

U.S. PATENT DOCUMENTS

| | | | |
|---|---|---|---|
| 2015/0373385 A1* | 12/2015 | Straub | H04N 21/23424 |
| | | | 725/34 |
| 2016/0103830 A1 | 4/2016 | Cheong et al. | |
| 2016/0164841 A1 | 6/2016 | Mikhailov et al. | |
| 2016/0165173 A1 | 6/2016 | Lesh | |
| 2016/0188344 A1 | 6/2016 | Tamir et al. | |
| 2016/0191133 A1 | 6/2016 | Noh et al. | |
| 2016/0269455 A1* | 9/2016 | Casey | H04L 65/61 |
| 2016/0307596 A1 | 10/2016 | Hardin et al. | |
| 2016/0323617 A1 | 11/2016 | Marchand et al. | |
| 2016/0330764 A1 | 11/2016 | Kim et al. | |
| 2017/0127298 A1 | 5/2017 | Ryu et al. | |
| 2017/0171766 A1 | 6/2017 | Amizur | |
| 2017/0244926 A1 | 8/2017 | Kotab | |
| 2017/0302959 A1 | 10/2017 | Samchuk et al. | |
| 2017/0366833 A1 | 12/2017 | Amidei et al. | |
| 2018/0014041 A1 | 1/2018 | Chen et al. | |
| 2018/0131979 A1 | 5/2018 | Bayoumi et al. | |
| 2018/0192094 A1 | 7/2018 | Barnett et al. | |
| 2018/0213251 A1 | 7/2018 | Ikonin et al. | |
| 2018/0368122 A1 | 12/2018 | Kuchibhotla et al. | |
| 2018/0376474 A1 | 12/2018 | Khoryaev et al. | |
| 2019/0014337 A1 | 1/2019 | Skupin et al. | |
| 2019/0014363 A1 | 1/2019 | Skupin et al. | |
| 2019/0069004 A1 | 2/2019 | Badawiyeh | |
| 2019/0069038 A1 | 2/2019 | Phillips | |
| 2019/0158906 A1 | 5/2019 | Gonder et al. | |
| 2019/0166306 A1 | 5/2019 | Zen et al. | |
| 2020/0037046 A1 | 1/2020 | Hardin et al. | |
| 2020/0045110 A1 | 2/2020 | Varnica et al. | |
| 2021/0281893 A1 | 9/2021 | Badawiyeh | |

FOREIGN PATENT DOCUMENTS

| | | |
|---|---|---|
| JP | 2013524618 A | 6/2013 |
| JP | 2017519382 A | 7/2017 |
| JP | 2019208210 A | 12/2019 |
| WO | WO-2013058684 A1 | 4/2013 |
| WO | WO-2015142741 A2 | 9/2015 |

OTHER PUBLICATIONS

Ting et al., "Trick play schemes for advanced television recording on digital VCR", IEEE, doi: 10.1109/30.477236, pp. 1159-1168, Nov. 1995. (Year: 1995).*

Zhu et al., "Trick Play Function for VOD with SVC source", IEEE, doi: 10.1109/EUC.2010.44, 2010, pp. 255-259. (Year: 2010).*

Yuan et al., "A mixed scheme to improve subjective quality in low bitrate video," 2004 IEEE Wireless Communications and Networking Conference (IEEE Cat. No. 04TH8733), 2004, pp. 1754-1759 vol. 3, doi: 10.1109/WCNC.2004.1311818. (Year: 2004).*

Bentaleb et al., "A Survey on Bitrate Adaptation Schemes for Streaming Media Over HTTP," in IEEE Communications Surveys & Tutorials, vol. 21, No. 1, pp. 562-585, Firstquarter 2019, doi: 10.1109/COMST.2018.2862938. (Year: 2019).*

Zhang et al., "Implementing hierarchical trick play for HTTP video streaming," 2010 IEEE Globecom Workshops, 2010, pp. 465-468, doi: 10.1109/GLOCOMW.2010.5700363. (Year: 2010).*

* cited by examiner

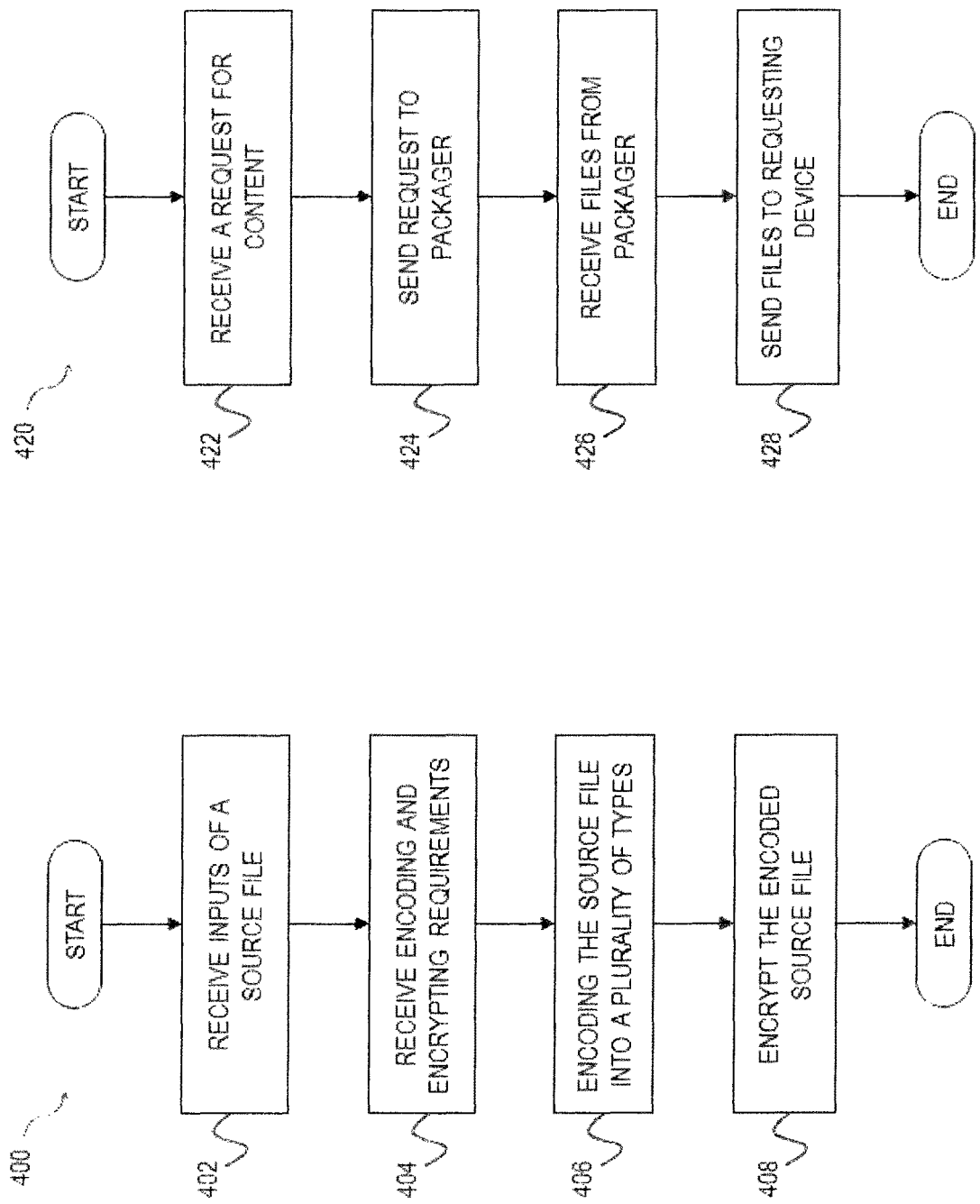

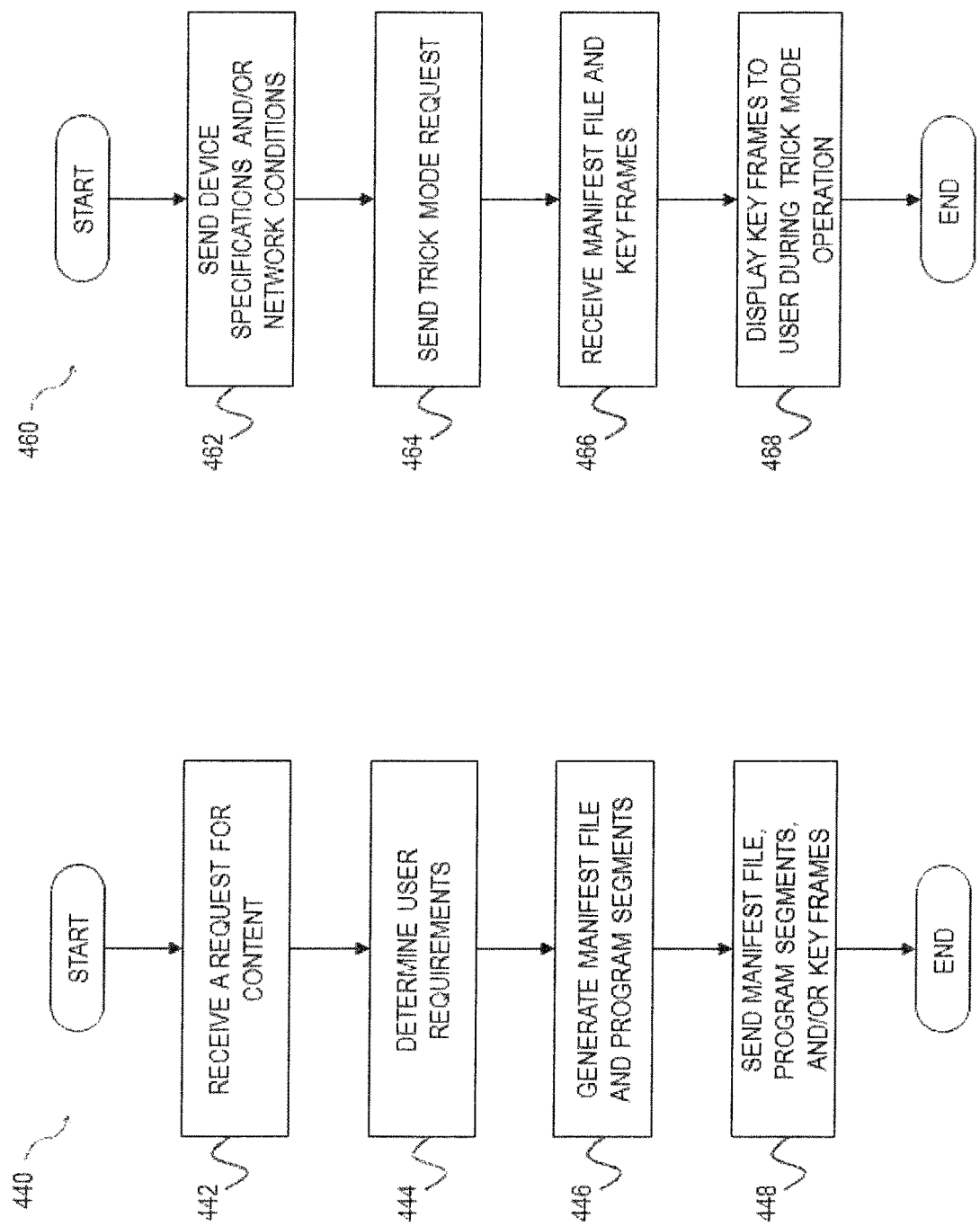

APPARATUS AND METHODS FOR PRESENTATION OF KEY FRAMES IN ENCRYPTED CONTENT

PRIORITY AND RELATED APPLICATIONS

This application is a divisional of and claims priority to co-owned and co-pending U.S. patent application Ser. No. 15/204,610 of the same title filed Jul. 7, 2016, and issuing as U.S. Pat. No. 10,652,594 on May 12, 2020, incorporated herein by reference in its entirety.

Additionally, the present application is related to co-owned and co-pending U.S. application Ser. No. 14/686,584 filed on Apr. 14, 2015 entitled "APPARATUS AND METHODS FOR THUMBNAIL GENERATION" and U.S. application Ser. No. 14/220,021 filed on Mar. 19, 2014 entitled "APPARATUS AND METHODS FOR RECORDING A MEDIA STREAM", each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of delivery of protected digital media data (e.g., text, video, and/or audio) over data delivery networks, such as an Internet Protocol Television (IPTV) network, and/or the Internet; and specifically in one aspect to the implementation of a preview or trick play mode for the protected digital media data.

2. Description of Related Technology

Video compression is used in many current and emerging products, such as digital television set-top boxes (STBs), digital satellite systems (DSSs), high definition television (HDTV) decoders, mobile devices such as tablets, smartphones, and personal media devices (PMDs), digital versatile disk (DVD) players, video conferencing, Internet video and multimedia content, and other digital video applications. Without video compression, digital video content can be extremely large, making it difficult or even impossible for the digital video content to be efficiently stored, transmitted, or viewed.

There are numerous video coding methods that compress digital video content. Consequently, video coding standards have been developed to standardize the various video coding methods so that the compressed digital video content is rendered in formats that a majority of video decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H.261, and ITU-T H.263 standards. The MPEG-4 Advanced Video Coding (AVC) standard (also known as MPEG-4, Part 10) is a newer standard jointly developed by the International Organization for Standardization (ISO) and ITU-T. The MPEG-4 AVC standard is published as ITU-T H.264 and ISO/IEC 14496-10. For purposes of clarity, MPEG-4 AVC is referred to herein as H.264.

Prior art video decoding generally comprises three frame types, Intra frames (I-frames), Predictive frames (P-frames), and Bi-directional frames (B-frames). H.264 allows other types of coding such as Switching I (SI) and Switching P (SP) in the Extended Profile. I-frames are generally more important to a video codec than P-frames, and P-frames are generally more important to a video codec than B-frames. B-frames are dependent on previous I-frames and P-frames.

Most modern video coding standards, such as H.264, are based in part on a temporal prediction with motion compensation (MC) algorithm. Temporal prediction with motion compensation is used to remove temporal redundancy between successive frames in a digital video broadcast. The temporal prediction with motion compensation algorithm includes a motion estimation (ME) algorithm that typically utilizes one or more reference pictures to encode a particular picture. A reference picture is a picture that has already been encoded. By comparing the particular picture that is to be encoded with one of the reference pictures, the temporal prediction with motion compensation algorithm can take advantage of the temporal redundancy that exists between the reference picture and the particular picture that is to be encoded and encode the picture with a higher amount of compression than if the picture were encoded without using the temporal prediction with motion compensation algorithm.

Motion estimation in an encoder is typically a computationally intensive process, and hence where speed and reduced processing overhead are desired, reduction or even removal of motion compensation processing can greatly expedite e.g., display or rendering of video data.

Adaptive bitrate (ABR) streaming is a technique to distribute program content over a large distributed network. Multiple bitrates of a particular piece of content are available to stream to a viewer, and the selection of the bit rate is based on current network conditions. This means that when there is greater bandwidth availability, a larger bitrate version of the content may be selected. If available bandwidth narrows, a lower bitrate (i.e., smaller) version of the content may be selected to provide a seamless user experience.

During playback of protected content whether through traditional digital video recorder (DVR) or network-based delivery, a user is additionally provided with an ability to perform various trick play mode functions including e.g., pause, rewind, fast forward, etc. These trick play mode functions are available to streaming media and existing Video-on-Demand (VOD) solutions as well.

In one approach, one or more "thumbnail" images are displayed to the user upon selection of a fast forward, rewind, pause, random seek command, or other trick play mode button. The display of the thumbnails requires the creation of a large number of stand-alone image files which are referenced to particular positions within the content. For example, if a thumbnail needs to be generated for every two seconds of content on a particular platform for a movie lasting two hours, 3600 thumbnails would need to be generated and managed. This requires a large amount of storage and content management for the variety of image files required under the existing solution.

Further, traditional DVR and network-based delivery mechanisms for playback of protected content do not support protected image files for trick play mode of the protected content. Displaying unprotected thumbnail images of the protected content compromises the content provider's digital rights over the protected content.

Based on the foregoing, it is clear that while prior art solutions have generally recognized the benefits of adaptive bitrate streaming and trick play mode functionality, technical limitations pose a storage and content management problem on the networks that store the content. What is needed is methods and apparatus for implementing trick play mode operation which does not tax the system storage, which are easily managed, and which preserves the content provider's digital rights over the protected content.

SUMMARY

The present disclosure addresses the foregoing needs by providing, inter alia, methods and apparatus for implementing trick play mode for use in streaming of protected content via generating and utilizing a manifest file listing the locations of key frames of the protected content.

In one aspect of the disclosure, an apparatus for processing encrypted or protected media data is described. In one embodiment, the apparatus is configured to generate preview or thumbnail images from various portions of the media data while still maintaining the applied encryption or protection of the content.

In another aspect of the disclosure, methods for processing encrypted or protected media data are described. In one embodiment, the methods access I-frames of the media content to generate preview or thumbnail images while still maintaining the applied encryption or protection of the content.

In a further aspect, a non-transitory computer readable apparatus is disclosed. In one embodiment, the apparatus includes a storage medium having one or more computer programs disposed thereon. The one or more programs are configured to, when executed on a processing device, access I-frames of the media content to generate preview or thumbnail images while still maintaining the applied encryption or protection of the content.

In a further aspect, a packager apparatus is disclosed. In one embodiment, the packager apparatus includes: a first interface configured to communicate with a network; a storage apparatus; and a processor apparatus configured to execute at least one computer program, the at least one computer program comprising a plurality of instructions. In one variant, the instructions are configured to, when executed, cause the apparatus to: receive a video file for use with adaptive bitrate streaming, the video file comprising one or more key frames separated by transitional frames; generate a manifest file for the video file, the manifest file comprising a listing of byte information for the one or more key frames; provide the manifest file for delivery to a client device; receive, from the client device, a request for a key frame, the request comprising a byte offset and a number of bytes of the key frame; retrieve a portion of the video file referenced by the byte offset and the number of bytes included in the request for the key frame; and transmit the retrieved portion of the video file to the client device.

In yet another aspect, a preview-enabled client device is disclosed. In one embodiment, the client device comprises a wireless-enabled mobile device capable of rendering video and audio content thereon according to a prescribed encoding and protection format (e.g., MPEG-2 or MPEG-4/AVC, and DRM). In another embodiment, the client device comprises a digital set-top box used in conjunction with a managed content distribution network.

These and other aspects shall become apparent when considered in light of the disclosure provided herein.

BRIEF DESCRIPTION OF THE DRAWINGS

FIG. 4a is a logical flow diagram representing one embodiment of a method for encoding a content stream.

FIG. 4b is a logical flow diagram representing one embodiment of a method for operating a content delivery network.

FIG. 4c is a logical flow diagram representing one embodiment of a method for operating a Just in Time Packager.

FIG. 4d is a logical flow diagram representing one embodiment of a method for operating a consumer premises equipment (CPE).

Figure 1:
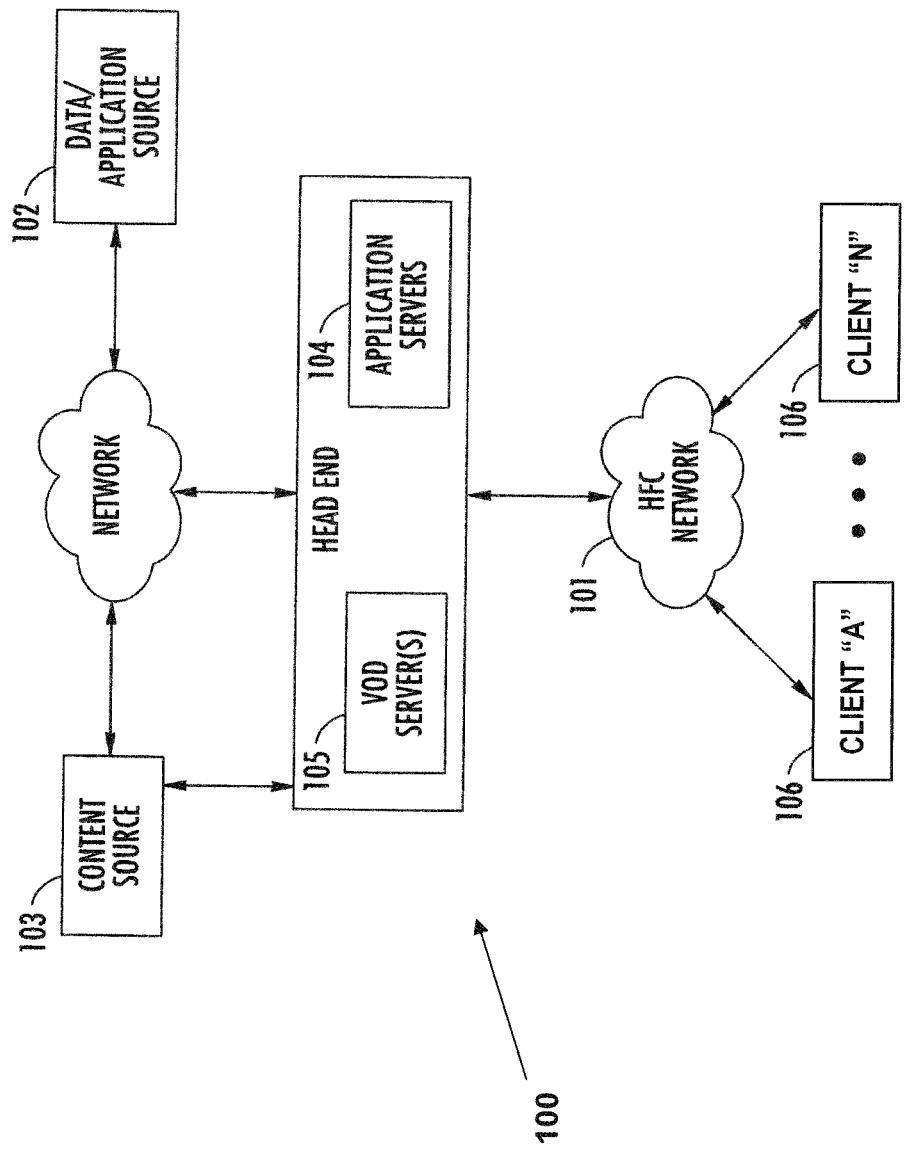
FIG. 1 is a functional block diagram illustrating an exemplary hybrid fiber network configuration useful with various aspects of the present disclosure.

All figures © Copyright 2016 Time Warner Enterprises LLC All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator, etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, Smart TVs, USB-based devices, and vehicle infotainment or navigation systems.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0, and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11, Wi-Fi Direct, etc.), LTE/LTE-A, WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information, whether local, virtual, or cloud-based.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one aspect, a system that utilizes a manifest file listing the location of key frames during trick play mode operation (e.g., fast forward, rewind, pause, or random seek operation) of a video file is disclosed. In one exemplary embodiment, a content server generates the manifest file for a video file which assigns a majority of its bits to the key frames (e.g., intra-coded frames (I-frames)), and which minimizes the number of bits which are assigned to "delta frames" (e.g., forward predicted frames (P-frames) and bidirectionally predicted frames (B-frames)). The content server generates a master manifest file listing all components for playback of the video content. Information regarding a naming convention and/or how to reference the video file listed in a manifest file may be reformatted by the content server to fit the needs of any device receiving the video content. The manifest file is provided to a video player of a client device, and the video player uses the manifest file to play back video content already available on the client device or to issue commands to the content server to provide video content to the client device for presentation to a user.

The content server can include components for trick play mode, including the timecodes and "playback" locations for the key frames of the video file, in the master manifest file, or the content server can generate a key frame only manifest file listing the components for trick play mode. In anticipation of or in response to a user entering a trick play mode function (e.g., fast forward, rewind, pause, stop, random seek, etc.), the video player uses the manifest file to begin making calls for key frames in order to display the key frames to the user to browse through the video content. The video player requests the key frames from the content server by providing the playback locations of the key frames to the content server, and the content server provides the key frames to the video player. In some implementations, the content server decrypts and decodes the key frames prior to providing the key frames to the video player. Alternatively, the content server provides encoded and encrypted key frames to the video player, and the video player decrypts and decodes the key frames to present the key frames to the user.

In addition, content protection schemes may be advantageously deployed at e.g., a gateway, the client device, and/or one or more network entities, consistent with the various aspects disclosed herein.

Detailed Description of Exemplary Embodiments

Exemplary embodiments of the apparatus and methods of the present disclosure are now described in detail. While these exemplary embodiments are described in the context of a managed network (e.g., hybrid fiber coax (HFC) cable) architecture having a multiple systems operator (MSO), digital networking capability, IP delivery capability, and a plurality of client devices, the general principles and advantages of the disclosure may be extended to other types of networks and architectures that are configured to deliver digital media data (e.g., text, video, and/or audio), whether managed or unmanaged. Such other networks or architectures may be broadband, narrowband, wired or wireless, or otherwise.

It will also be appreciated that while described generally in the context of a network providing service to a customer or consumer (e.g., residential) end user domain, the present disclosure may be readily adapted to other types of environments including, e.g., commercial/enterprise and government/military applications. Myriad other applications are possible.

It is further noted that while exemplary embodiments are described primarily in the context of a cable system with 6 MHz RF channels, the present disclosure is applicable to literally any network topology or paradigm, and any frequency/bandwidth or transport modality.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Bearer Network—

FIG. 1 illustrates a typical content delivery network configuration. The various components of the network 100 include (i) one or more data and application origination points 102; (ii) one or more content sources 103, (iii) one or more application distribution servers 104; (iv) one or more video on-demand (VOD) servers 105, and (v) client devices 106. The application distribution server(s) 104, VOD servers 105, and client device(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, application distribution servers, VOD servers, and/or client devices (as well as different network topologies) may be utilized consistent with the present disclosure. For example, the headend architecture of FIG. 1a (described in greater detail below), or others, may be used.

The data/application origination point 102 comprises any medium that allows data and/or applications (such as a VOD-based or "Watch TV" application) to be transferred to the application distribution server 104. This may include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications enter the network system. Application distribution servers are well known in the networking arts, and accordingly not described further herein.

The VOD server 105 comprises a computer system where on-demand content is received from one or more of the aforementioned data sources 102 and enter the network system. These servers may generate the content locally, or alternatively act as a gateway or intermediary from a distant source.

The client device 106 includes any equipment in the "customers' premises" (or other locations, whether local or remote to the application distribution server 104) that may be accessed by an application distribution server 104.

The VOD server 105 and application distribution servers 104 are a part of the headend architecture of the network 100. The headend is connected to an internetwork (e.g., the Internet).

Figure 1A:
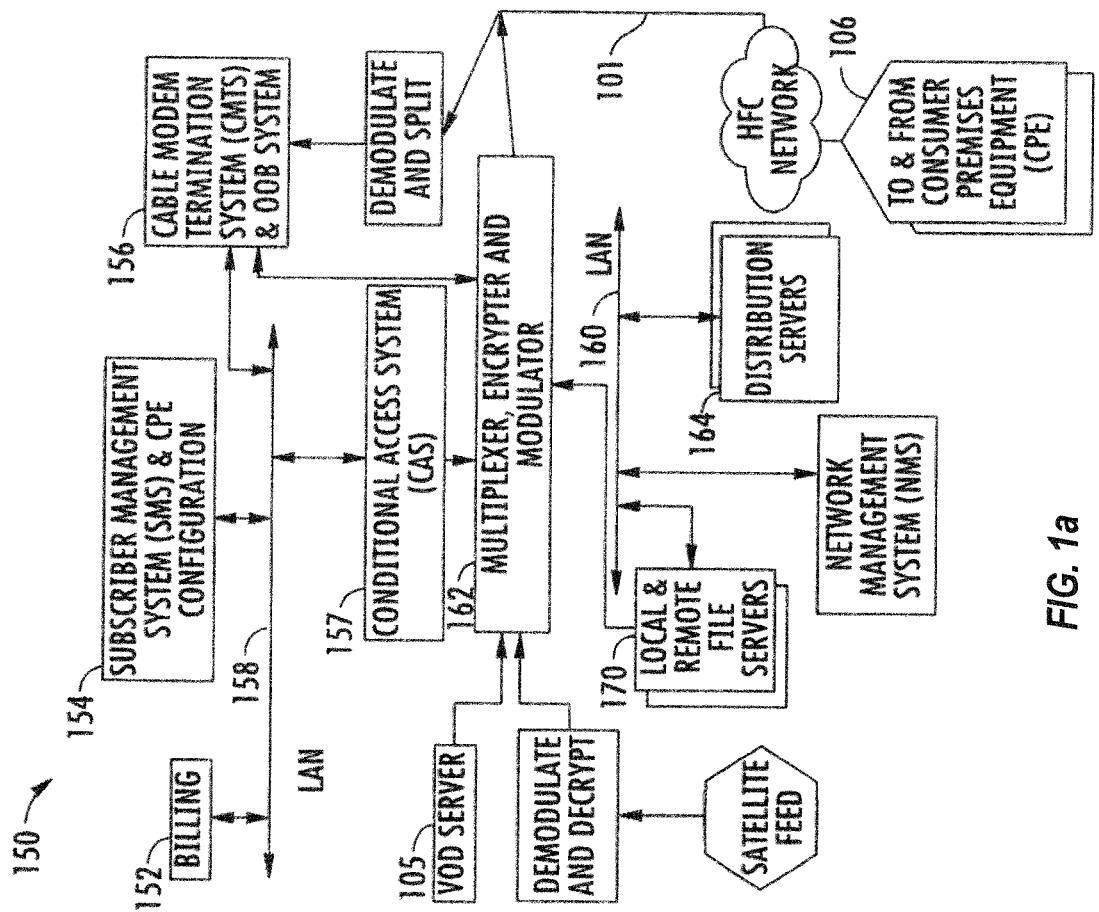
FIG. 1a is a functional block diagram illustrating one exemplary network headend configuration.

Referring now to FIG. 1a, one exemplary embodiment of a headend architecture is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Figure 1B:
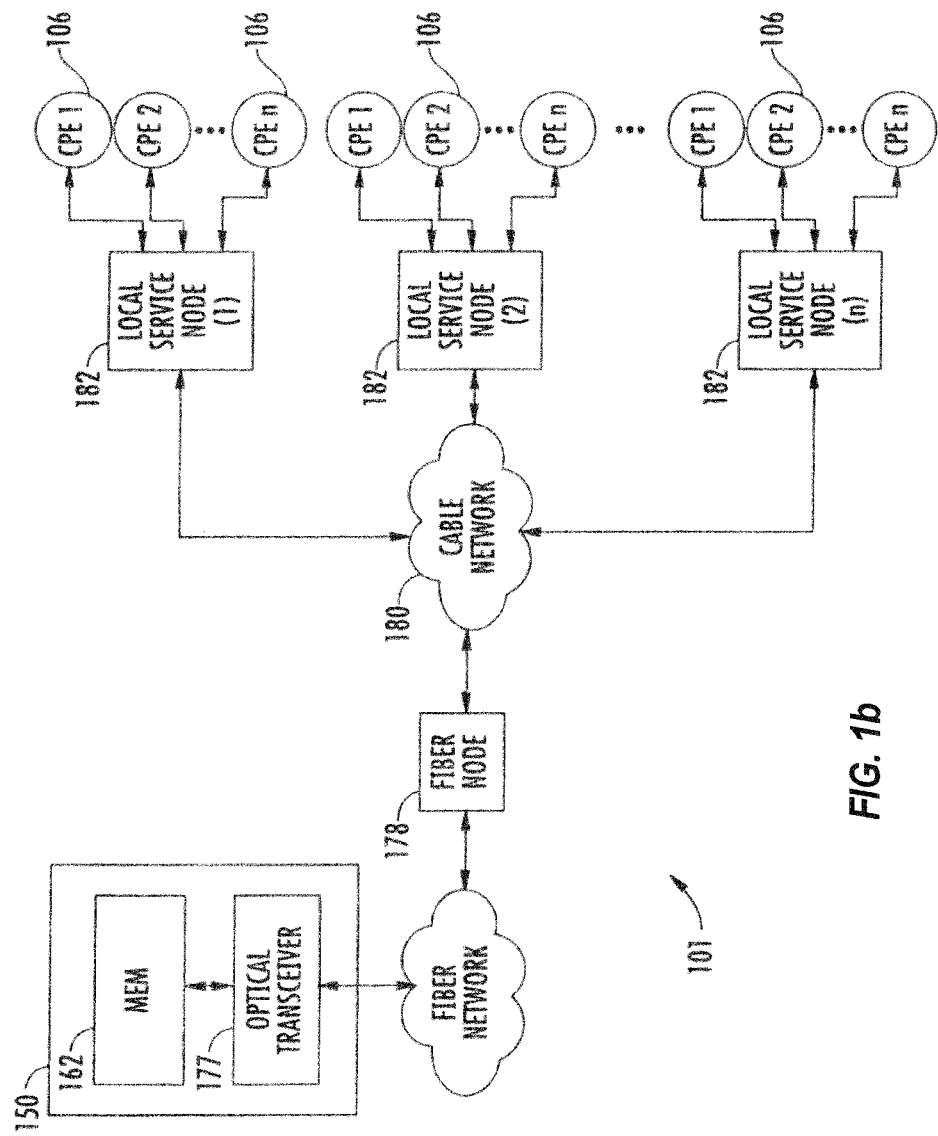
FIG. 1b is a functional block diagram illustrating one exemplary local service node configuration useful with various aspects of the present disclosure.

The exemplary architecture 150 of FIG. 1*a* further includes a conditional access system (CAS) 157 and a multiplexer-encrypter-modulator (MEM) 162 adapted to process or condition content for transmission over the HFC network 101. The application distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers 105 are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the client devices 106 ("downstream") are multiplexed together in the headend, as previously described and sent to neighborhood hubs via a variety of interposed network components as shown in FIG. 1*b*.

Content (e.g., audio, video, data, files, etc.) is provided in each downstream (in-band) channel associated with the relevant service group. To communicate with the headend or intermediary node (e.g., hub server), the client devices 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

In another embodiment, an exemplary "switched" network architecture can be used to deliver content to clients and/or other networks. Switching architectures allow improved efficiency of bandwidth use for ordinary digital broadcast programs. Ideally, the subscriber is unaware of any difference between programs delivered using a switched network and ordinary streaming broadcast delivery.

Co-owned U.S. Pat. No. 8,713,623 entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture, although it will be recognized by those of ordinary skill that other approaches and architectures may be substituted.

In addition to "broadcast" content (e.g., video programming), the systems of FIGS. 1*a* and 1*b* (and 1*c* and 1*d* discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

"Packetized Networks"—

Figure 1C:
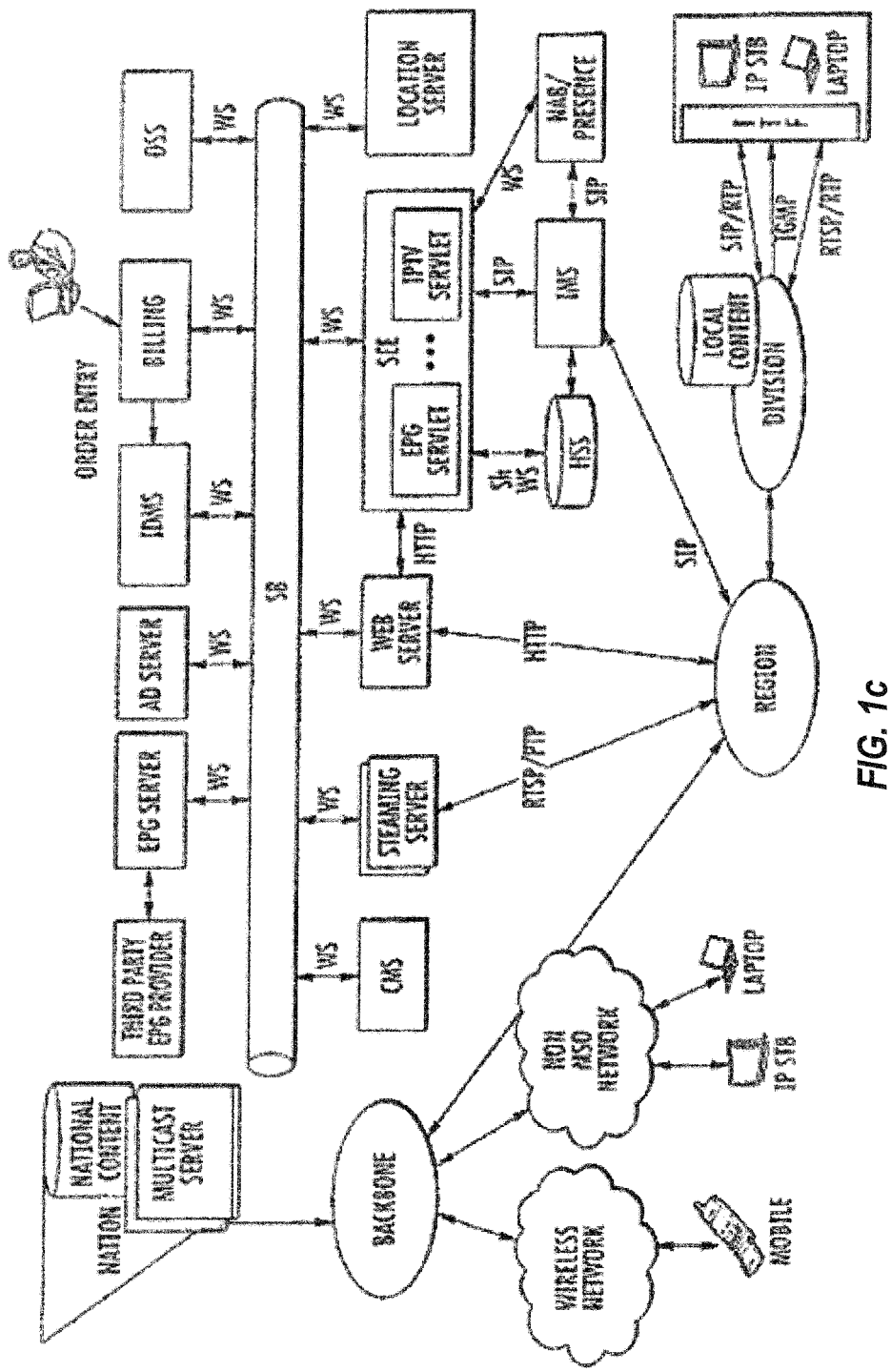
FIG. 1c is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., IPTV content). FIG. 1*c* illustrates one exemplary implementation of such a network, in the context of a 3GPP IMS (IP Multimedia Subsystem) network with common control plane and service delivery platform (SDP), as described in co-owned U.S. application Ser. No. 12/764,746 filed Apr. 21, 2010 entitled "METHODS AND APPARATUS FOR PACKETIZED CONTENT DELIVERY OVER A CONTENT DELIVERY NETWORK," and issued as U.S. Pat. No. 10,264,029 on Apr. 16, 2019, which is incorporated herein by reference in its entirety. Such a network provides, inter alia, significant enhancements in terms of common control of different services, implementation, and management of content delivery sessions according to unicast or multicast models, etc.; however, it is appreciated that the various features of the present disclosure are in no way limited to this or any of the other foregoing architectures.

Figure 1D:
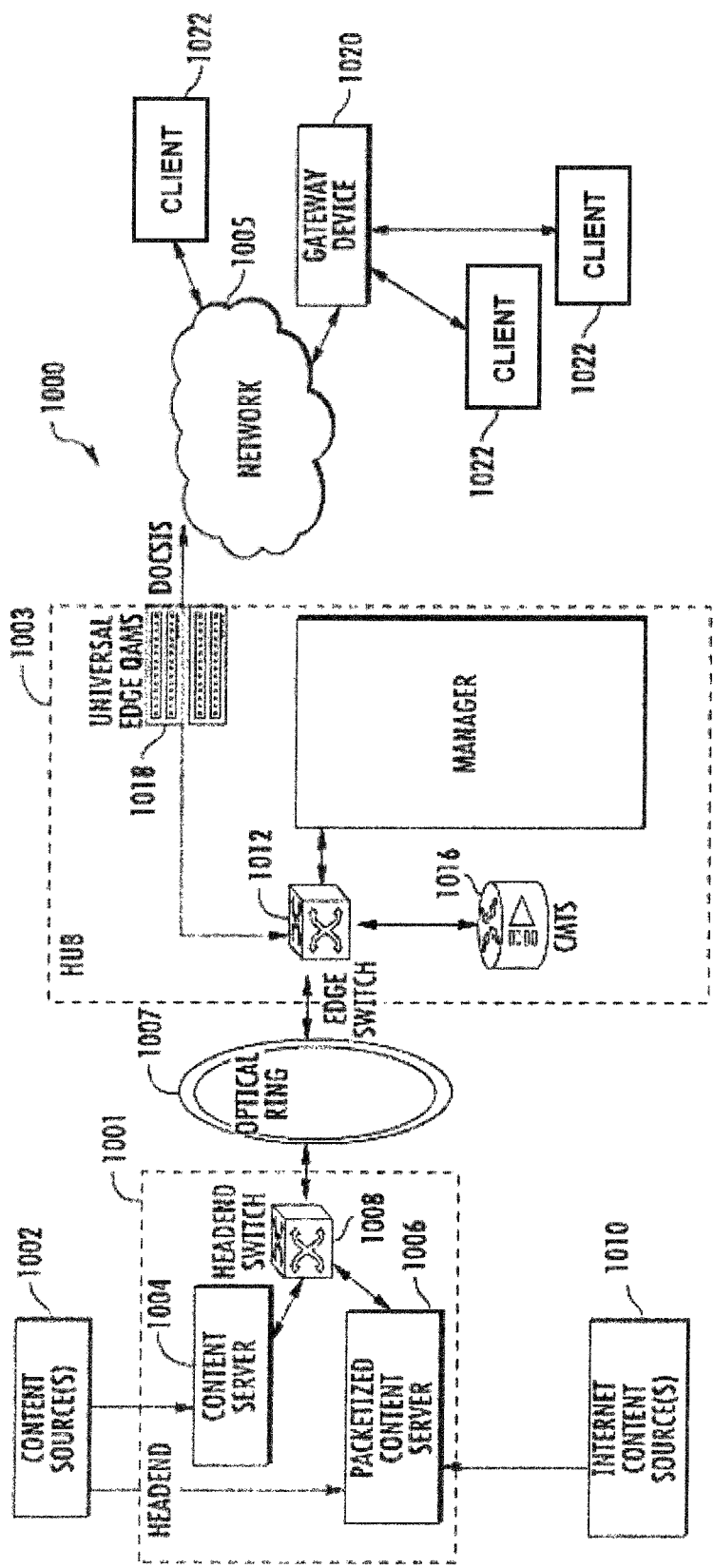
FIG. 1d is a functional block diagram illustrating a second exemplary packetized content delivery network architecture useful with various aspects of the present disclosure.

FIG. 1*d* illustrates another exemplary network architecture for the delivery of packetized content that may be useful with the present disclosure. In addition to on-demand and broadcast content (e.g., video programming), the system of FIG. 1*d* may deliver Internet data services using the Internet protocol (IP), although other protocols and transport mechanisms of the type well known in the digital communication art may be substituted.

The network 1000 generally comprises a local headend 1001 in communication with at least one hub 1003 via an optical ring 1007. The distribution hub 1003 is able to provide content to various user devices, client devices 1022, and gateway devices 1020, via a network 1005.

Various content sources 1002 are used to provide content to a content server 1004. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 1010 (such as e.g., a web server) provide internet content to a packetized content server 1006. Other IP content may also be received at the packetized content server 1006, such as voice over IP (VoIP) and/or IPTV content. Content may also be received from subscriber and non-subscriber devices (e.g., a PC or smartphone-originated user made video). In one embodiment, the functionality of both the content server 1004 and packetized content server 1006 may be integrated into a single server entity.

A central media server located in the headend 1001 may be used as an installed backup to the hub media servers as (i) the primary source for lower demand services, and (ii) as the source of the real time, centrally encoded programs with PVR (personal video recorder) capabilities. By distributing the servers to the hub stations 1003 as shown in FIG. 1*d*, the size of the fiber transport network associated with delivering VOD services from the central headend media server is advantageously reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, HFCu, etc., subscriber CPE-based session requests, while a different configuration or architecture may be used for servicing mobile client requests. Similarly, the content servers 1004, 1006 may either be single-purpose/dedicated (e.g., where a given server is dedicated only to servicing certain types of requests), or alternatively multi-purpose (e.g., where a given server is capable of servicing requests from different sources).

The network 1000 of FIG. 1*d* may further include a legacy multiplexer/encrypter/modulator (MEM; not shown) coupled to the network 1005 adapted to "condition" content for transmission over the network. In the present context, the content server 1004 and packetized content server 1006 may be coupled to the aforementioned LAN, thereby providing access to the MEM and network 1005 via one or more file servers (not shown). The content server 1004 and packetized content server 1006 are coupled via the LAN to a headend switching device 1008 such as an 802.3z Gigabit Ethernet (or incipient "10G") device. Video and audio content is multiplexed at the headend 1001 and transmitted to the edge switch device 1012 (which may also comprise an 802.3z Gigabit Ethernet device).

In one exemplary delivery paradigm MPEG-based video content may be delivered, with the video transported to user PCs (or IP-based client devices) over the relevant transport (e.g., DOCSIS channels) comprising MPEG (or other video codec such as H.264 or AVC) over IP over MPEG. That is, the higher layer MPEG or other encoded content may be encapsulated using an IP protocol, which then utilizes an MPEG packetization of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs.

Individual client devices 1022 of the implementation of FIG. 1*d* may be configured to monitor the particular assigned RF channel (such as via a port or socket ID/address, or other such mechanism) for IP packets intended for the subscriber premises/address that they serve.

In the switched digital variant, the IP packets associated with Internet services are received by edge switch, and forwarded to the cable modem termination system (CMTS) 1016. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the RF channels used for the broadcast video and audio programming, although this is not a requirement. As noted above, the client devices are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 1018. According to this embodiment, all of the content is delivered on DOCSIS channels, which are received by a premises gateway 1020 (described subsequently herein) and distributed to one or more client devices 1022 in communication therewith. Alternatively, the client devices 1022 may be configured to receive IP content directly without need of the gateway or other intermediary. As a complementary or back-up mechanism, audio/video content may also be provided in downstream (in-band) channels as discussed above; i.e., via traditional "video" in-band QAMs. In this fashion, a co-enabled digital set-top box (DSTB) or other client devices could readily tune to the new (in-band) RF video QAM in the event that their IP session over the DOCSIS QAM is for some reason interrupted. This may even be accomplished via appropriate logic within the client devices (e.g., autonomously, or based on signaling received from the headend or other upstream entity, or even at direction of a user in the premises; e.g., by selecting an appropriate DSTB or other client device function).

In the embodiment illustrated in FIG. 1*d*, IP packetized content is provided to various user devices via the network 1005. For example, content may be delivered to a gateway apparatus 1020 which distributes content received thereat to one or more client devices 1022 in communication with the apparatus 1020.

In another variant, IP simulcast content and existing on-demand, voice, and broadcast content are all provided to the headend switch device 1008 of FIG. 1*d*. The headend switch 1008 then provides the content to the optical ring 1007 for provision to one or more distribution hubs 1003. IP simulcast content is in one exemplary implementation retrieved from a plurality of content sources at an IPTV server.

The IP-packet content is transmitted to subscriber devices via the universal edge QAM 1018 and the edge network 1005. The IP video ("simulcast") content is presented to client devices capable of receiving content over the DOCSIS QAMs. For example, the aforementioned gateway device 1020 (as well as an advanced client device 1022 such as an IP-enabled DSTB) may receive the IP simulcast. Legacy CPE may receive content via the gateway device 1020, or via an audio/video "back-up" MPEG transport stream as previously described.

In the illustrated embodiment, the gateway device 1020 serves as a gateway to the IP content for other client devices (such as other client devices 1022 and PMD). The gateway device 1020 may communicate with one or more connected client devices 1022, as well as utilize Wi-Fi capabilities (where so equipped) to communicate wirelessly to other devices. It will also be recognized that the present disclosure may be configured with one or more short-range wireless links such as Bluetooth for lower bandwidth applications (or UWB/PAN for greater bandwidth applications).

It is still further appreciated that the delivery of content may include delivery from an "off-net" distribution hub (not shown) to another network (not shown), not associated with the MSO. In this embodiment, a requesting device (such as client device 1022 or gateway 1020) may request content from a local headend 1001 which is transferred over both MSO-maintained ("on-net") and "off-net" networks advantageously.

Network Architecture for Recording and Distributing Media—

Figure 2:
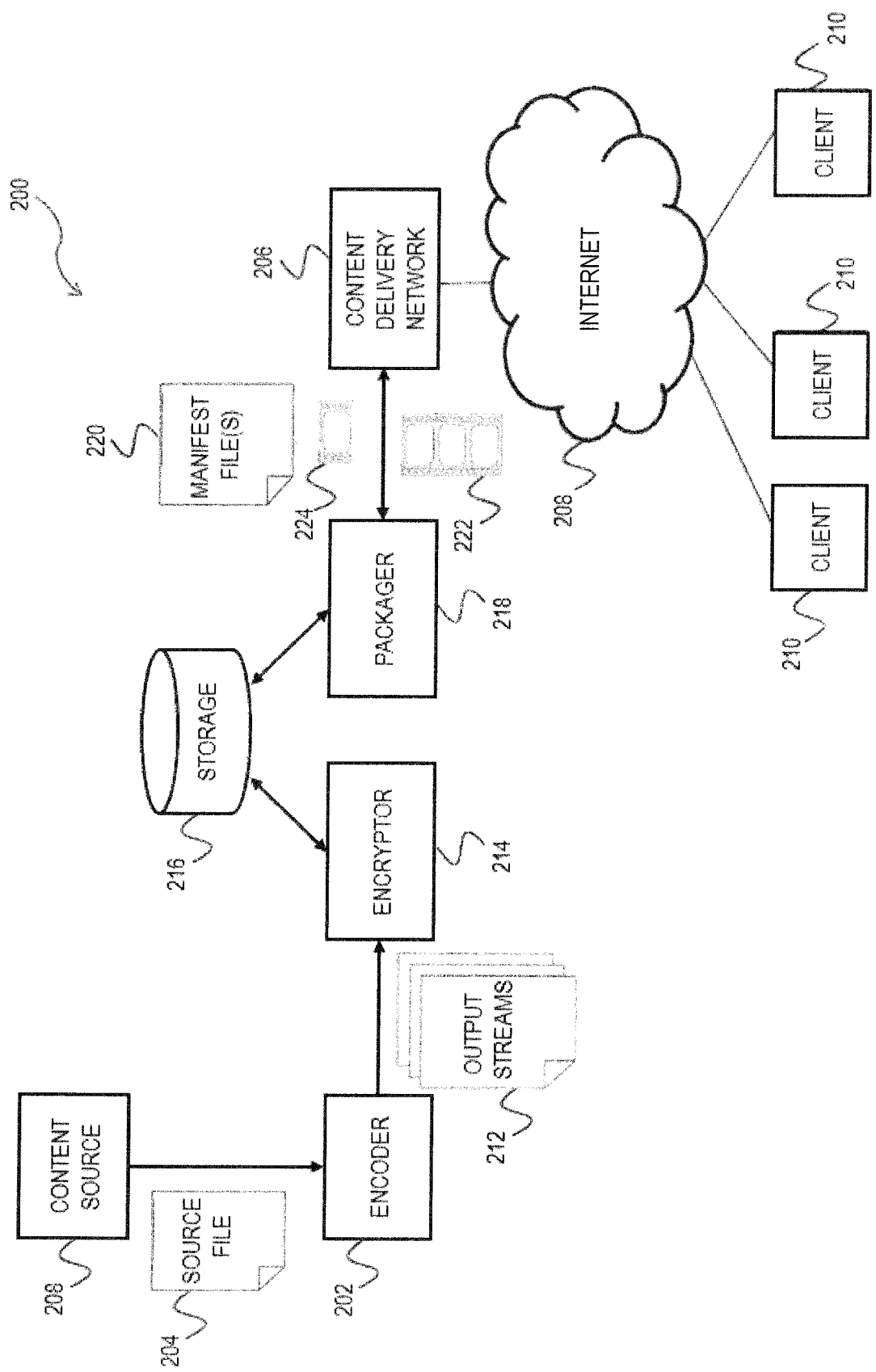
FIG. 2 is a functional block diagram of an exemplary network useful in conjunction with various principles described herein.

FIG. 2 discloses an exemplary configuration of an architecture 200 for providing video or other media content to client devices 210 via a content delivery network (CDN) 206. The CDN 206 is in communication with client devices 210 via the network 208. In one embodiment of the present disclosure, the network 208 comprises an internet, such as e.g., the Internet. While described in the context of an Internet Protocol network, it will be recognized that the principles of the disclosure may be extended to other transport modalities and network paradigms.

The requesting client device 210 may include home gateway devices and/or media client devices. In one embodiment a media client device is a portable device. Common examples of portable devices include, without limitation, tablets, phablets, smart phones, smart televisions (TVs), desktop and laptop personal computers (PC), and portable media players. In another embodiment, the media client device may comprise a file server; file servers are common in both commercial and residential use. For example, a subscriber may have a PC which can play media files, but which also serves his/her other consumer electronics (e.g., smart phone and tablet).

In one embodiment of the present disclosure, an encoder 202 encodes a source file 204 from a content source 208 into at least one encoding format (e.g., transcodes a source file from one format to at least one other format). In another variant, the source file 204 is encoded into a plurality of encodings that correspond to a respective plurality of one or more device types, codecs, resolutions, file formats, audio encodings, bit rates, etc. The variety of encodings may be utilized by the CDN 206 (and the packager 218) via adaptive bitrate (ABR) streaming.

"Adaptive bitrate (ABR) streaming" refers to streaming multimedia over computer networks such that a source file thereof is encoded into multiple bitrates. Encoded content segments of varying bit rates are sent to a client device. Non-limiting examples of ABR streaming include, without limitation, MPEG-Dynamic Adaptive Streaming over HTTP (DASH), Adobe® Dynamic Streaming for flash, Apple® HTTP Adaptive Streaming, Microsoft® Smooth Streaming, QuavStreams® Adaptive Streaming over HTTP, and upLynk®.

As shown in FIG. 2, a source file 204 from a content source 208 is input to the encoder 202. Various content sources 208 may provide source files 204 to the encoder 202. For example, content may be received from a local, regional, or network content library as discussed in co-owned U.S. Pat. No. 8,997,136 previously incorporated herein. Alternatively, content may be received from linear analog or digital feeds, as well as third party content sources. Internet content sources (such as e.g., a web server) may also provide Internet content to the encoder 202. In yet another embodiment, content may be received from subscriber and/or non-subscriber devices (e.g., a PC or smartphone-originated user made video).

The source file 204 may be encoded in a variety of formats (both audio and video), bit rates, resolutions, which are each playable on a variety of devices. Accordingly, one or more output streams 212 are produced by the encoder 202. For example, a content delivery network may enable a wide variety of user devices to play a certain piece of content. Accordingly, a network operator selects to have the encoder 202 encode the content into multiple formats for use on the variety of players. In a further embodiment, a network operator selects to utilize adaptive bitrate streaming such that multiple bit rate streams are utilized by selecting an optimized stream from the output streams 212, e.g., the stream that best utilizes the viewer's device and current bandwidth constraints to provide an optimal playback experience. The optimization occurs via a process or application running at the encoder 202.

An output stream 212 comprises key frames (e.g., I-frames) at a certain temporal distance (e.g., 2 seconds or 10 seconds) apart. A key frame is a fully specified picture like a conventional static image file. Key frames may be placed in any number of temporal distances, from 0 (i.e., every frame is a key frame) to a single key frame followed by all delta frames, per stream. Any frame of the output stream 212 may be a key frame (e.g., the first frame, the last frame, and/or any frame between the first and last frame). A greater number of key frames allows the video stream to be segmented in a greater number of places (however, the amount of compression available may be limited where the number of key frames used is higher, but processing of the video frame would correspondingly be less because the full image does not have to be generated from predictive delta frames as frequently).

Parameters used by the encoder 202 to encode the source file 204 include: (i) whether the output streams should be encoded into separate video and audio only tracks, or video tracks with audio included, (ii) an appropriate key frame period, (iii) a frame rate, (iv) segmentation duration, (v) video resolutions, (vi) video bitrate, (vii) audio bit rate (where necessary), (viii) audio sample rate, (ix) a number of audio channels, (x) aspect ratio, (xi) video codec, (xii) specific device profiles, (xiii) audio volume, (xiv) file type and extension, and (xv) standard specific encoding profiles. Standard specific encoding profiles include e.g., H.264, which includes different standard encoding profiles for baseline, main, and high encoding. Additionally, the encoder 202 may utilize information used for cutting out other resolutions/aspect ratios from a higher resolution/different aspect ratio file. For example, the encoder 202 may center-punch a standard definition (SD) image or video from a high definition (HD) source. Similarly, an HD image or video may be center punched from a 4K, 8K, 16K source.

In one variant, the encoder 202 up-converts source files 204 to produce higher bit rate and higher resolution output streams 212. This could allow smaller bit rate source files 204 to be provided to the encoder 202 or allow a source file 204 that is natively lower resolution to be encoded into a wide array of output streams 212 for use on a wider variety of user devices 210 with a greater number of resolutions. The source file 204 may comprise an uncompressed source file 204 (when received at the encoder 202) and/or a source file 204 that has various degrees of compression.

While output streams 212 are shown as separate files (for example MPEG 4 transport stream (.ts) files), in a further embodiment of the present disclosure, all of the streams (i.e., streams 212) are presented in a single "super" file. Having a single comprehensive file comprising multiple streams will lower the number of files the CDN 206 must manage. A content curator would only have to manage the single file. The CMS only has to represent the single file. And the operator only would have to confirm the existence of the single file.

The encoder 202 may encode output streams 212 with audio tracks (e.g., AC3 audio). Different encoding formats and bit rates may be selected based on the requirements of the stream, end user equipment, and the protocols and formats used by the CDN 206.

The encoded output streams 212 are encrypted by an encryptor 214 via an encryption algorithm (e.g., AES, DES, public key encryption, etc.). The encoded and encrypted output streams are stored in a storage device 216. In one embodiment, the functionality of both the encoder 202 and the encryptor 214 may be integrated into a single apparatus The stored output streams are utilized by a packager 218 to provide a manifest (or index/playlist) file 220 and video segments 222 to a requesting client device 210. Specifically, the manifest file 220 is a data structure comprising a listing of addresses for each of the video segments 222 of a stream of data, and includes information about the video segments 222 such as bitrates, closed captioning, audio, etc. Different ABR models may use different manifest files 220. For example, with HTTP Smooth Streaming (HSS), each of the components (closed captioning, audio, etc.) are in separate files with addresses for each in the manifest file 220. With HTTP Live Streaming (HLS), audio is embedded in the segments 222 and thus are not separately listed in the manifest file 220.

In another embodiment, the manifest file 220 includes metadata, and a listing of media segment entries. Metadata refers to information used by a client device to interpret or otherwise manage the media segments (metadata is also colloquially referred to as "data regarding data" or "data relating to data"). Common examples of metadata include e.g., version information, protocol, file formats, supported codecs, resolution, encryption, temporal information (transmission time, time of presentation, time stamps, etc.), geographic information (restricted locations, locations for presentation, etc.), content type indicia, synchronization information, control data, etc. Stated differently, the metadata describes the media segments 222 and can be used as a reference file when assessing or otherwise making use of the media segments 222.

In one implementation, the list of media segment entries in the manifest file 220 comprises a list of network addresses (which may be remote or local) where the corresponding segments 222 of media content may be accessed and/or downloaded. For instance, each of the media segment entries may be listed by a Uniform Resource Locator (URL). In some embodiments, the entries may be in computing resource "path" format. Computing paths may be either absolute (i.e., the path provides the fully elaborated and unique location of the segment 222 in a file structure) or relative (i.e., the path provides a relative location of the segment 222 in a file structure). Additionally, in some embodiments, the entries may be in symbolic format, such that at least a portion of the entry must be further interpreted (i.e., is not human-readable). Common examples of this may include e.g., HyperText Markup Language (HTML) tags, proprietary tags, Java, Javascript, etc. Moreover, some implementations may substitute or intermingle any of the foregoing techniques to flexibly accommodate various operational models.

In another embodiment, the service provider or MSO is represented as a single logical entity (a single network domain) represented by a characteristic URL (e.g., www-.timewarnercable.com). In other embodiments, the service provider may be a conglomeration of multiple logical entities. Multiple logical entities may be useful to further distribute services over various network resources or enable additional features provided by partnered corporations or providers. Multiple logical entities, for example, may provide local content for a particular service group or geographic area. Furthermore, having content providing entities closer to end users may offer lower latency and may add network redundancy. Common examples of network resources include e.g., broadcast, multicast, video-on-demand, advertisement services, local services, etc. In one specific example, one exemplary stream manifest file may include entries from: www.timewarnercable.com, vod.timewarner.com (video on demand services), www.nhk.jp ($3^{rd}$ party content), www.adserver.com ($3^{rd}$ party advertisement services), etc.

In another example, the media segment listing may include a listing of URL links which is further punctuated with HTML tags or Javascript, which is configured to enable advertisement insertion and/or execution of complementary programming. For instance, the video client may substitute tailored locally stored advertisements for commercial breaks, rather than e.g., the default broadcasted commercial. In other embodiments, the video client may run a Javascript Applet that allows the subscriber to execute a command or otherwise provide feedback (e.g., to order pizza, vote on a reality show, etc.).

In the exemplary embodiment, each media segment 222 is an encoded and encrypted subsection or segment of media content. The media segments 222, when decrypted, decoded, and played in the appropriate order, render the original media content. In one implementation, each media segment 222 represents a portion of video associated with a specific resolution, codec, and time stamp. The media segments 222 are assembled according to a time stamp sequence.

In another embodiment, non-time-based segments may be used in the manifest file 220. For example, playback may occur according to the context of the sequence and not because of any implied meaning of the filename, or time stamp value. The true duration of a video segment is based on its contents and its presentation time stamp (PTS), which may not be represented in the manifest file 220. The sequence of the next media file listed in the manifest file is simply what comes next. Specifically, any schema could be used for the transport stream files in the manifest file, including 1.ts, 2.ts, 3.ts, etc., or A.ts, B.ts, C.ts.

The encoding parameters may be used by the packager 218, or a combination of any of the encoding parameters may be utilized between both the encoder 202 and the packager 218. For example, the packager 218 may utilize the segmentation duration parameters in order to splice the content streams 212 into segments 222. In another example, the packager 218 may utilize capabilities information of the end device 210 to create segments 222 from the output streams 212 that meet the specifications of the requesting device 210 (and put those addresses of those segments 222 in a manifest file 220). In yet another example, the packager 218 may utilize the key frame period parameter to generate a key frame manifest for implementing trick play mode operation (e.g., fast forward, rewind, pause, and/or random seek) when viewing the content.

The encoder 202 produces an output stream comprising key frames (i.e., whole frames that fully define an image) that may be decoded and decrypted for use in trick play mode operation. The packager 218 identifies the key frames of the video track and generates a key frame manifest listing the playback locations of the key frames of the video track. The key frame manifest may specify key frames at any location within a segment, e.g., the first key frame, the last key frame, and/or any key frame between the first and last frame. The key frame manifest may specify any number of key frames in a segment.

The packager 218 may identify the key frames using the key frame period parameter. Alternatively, the packager 218 may identify key frames by reading the encoded video to locate the I-frames via the header of the video. For example, the I-frame header byte for H.264 encoded video is byte 124 in the payload of the MPEG2 transport stream. The key frame manifest includes the byte offset and the number of bytes of the output stream file for each key frame, and the time code for each key frame. The packager 218 then provides the key frame manifest to the CDN 206, which in turn provides them to a client device 210 in anticipation of or in response to a request for trick play mode operation.

In one embodiment, the packager 218 generates one or more files containing only key frames. These key frame files are separate from the media segment files. The packager 218 generates a key frame manifest that identifies the byte ranges within these key frame files for indexing the key frames. The packager 218 may generate a single file containing all the key frames for a video asset, or multiple files each containing a Y number of key frames. The number of key frame files and the number of key frames within each file may be tuned to allow for best performance of the network and the client device. The key frame files may be transmitted to a client device and cached at the client device for quicker indexing of the desired key frames.

In one embodiment, the packager 218 identifies high interest or significant key frames in the video track. An example of a significant key frame includes a key frame indicative of a scene change. The packager 218 includes a listing of the playback locations of significant key frames in the key frame manifest. During normal playback or trick play mode operation of video content, the client device 210 uses the listing of significant key frames to highlight (e.g., rendered in a larger thumbnail, border, or highlight) to allow a user to skip to significant scenes of the video content (as opposed to an undifferentiated slideshow of every 2 second key frame). This kind of navigation of video content can also be modified for optimizing the graphical user interface (e.g., variably accelerating/decelerating scans, etc.) of the video player on the client device 210.

The client device 210 receives the key frame manifest and uses the key frame manifest to request the bytes of the video content for the desired key frames from the CDN 206. For example, a user of the client device 210 may enter a 2× fast forward operation, and the client device calculates the time codes corresponding to the 2× fast forward operation, parses the manifest for the time codes of the key frames, and requests the key frames with time codes closest to the calculated time codes. The requested key frame 224 may be the first frame, the last frame, or any frame in between the first and last frame of the output stream file or a segment 222. In an embodiment, the client device 210 requests some but not all key frames from the output stream for use during a trick play mode operation. In an alternative embodiment, the client device requests all key frames. The key frames 224 can be resized, encoded, or altered by the packager 218 to allow for a wide variety of presentation types (e.g., full screen, thumbnail, picture-in-picture) from a single output stream. This extraction of the key frames can occur on an as needed basis upon the request of the CDN 206 or client device 210. The key frames can be extracted and resized/altered/encoded on the fly, in real time, by the packager 218.

The manifest files 220 listing all components for playback of a piece of content may be generated by the packager 218 based on the registration of a user. In an alternative embodiment, the manifest file 220 (or a plurality of manifest files 220) is pre-generated for use with one particular ABR format. The manifest files 220 are generated based on the specific device and requirements of an end user device. For example, the Microsoft® Xbox® 360 and Xbox® One video game systems require different manifest files 220 to operate. Furthermore, different streaming standards may require different manifest files 220 to operate. For example, the MPEG-Dynamic Adaptive Streaming over Hyper Text Transfer Protocol (DASH) protocol may be implemented differently with respect to Hyper Text Transfer Protocol (HTTP) live streaming and Windows® Media Streaming. Thus, each may require different manifest files 220.

Media segments 222 are generated by the packager 218. The segments 222 may be of predetermined length. For example, a media segment 222 encrypted using an AES algorithm may have a length of 64 bytes. When a media segment is encrypted with 64 byte encryption boundaries, key frames within the segment may not fall on encryption boundaries. Indexing into a segment to extract a key frame that does not start on an encryption boundary may prevent the key frame from being decrypted. To allow for decryption in such a case, the video player may retrieve enough bytes preceding the key frame to enable decryption of the key frame. Alternatively, the packager 218 may generate separate encrypted video segments each containing only one key frame. The key frame manifest identifies these encrypted video segments to extract the key frames.

In addition, metadata describing the segments may be generated at the packager 218, or, alternatively at the encoder 202. As discussed herein, the media segments 222 form the basis for the generation of a manifest file 220. It is appreciated, however, that the foregoing functionality may be accomplished at various other network entities (such as at the encoder 202 or CDN 206), the foregoing being merely exemplary. For example, segmentation and encryption prior to a request for the content may optimize time to playback particularly for the first requestor. However, such a setup may pose a challenge for content management and storage scale. For example, if an encryption model is changed since the last time the video content was stored, the video content may need to be re-encrypted prior to service.

Access control such as Digital Rights Management (DRM), conditional access (CA), trusted domain (TD), etc. may be implemented by the packager 218 (or alternatively the CDN 206). One example of utilization of the foregoing technologies is described within co-owned U.S. patent application Ser. No. 13/710,308 filed on Dec. 10, 2012 entitled "APPARATUS AND METHODS FOR CONTENT TRANSFER PROTECTION," and issued as U.S. Pat. No. 9,565,472 on Feb. 7, 2017 which is incorporated herein by reference in its entirety. As discussed therein content is delivered via a managed content distribution network (such as a cable or satellite or HFCu network having an MSO), and the MSO manages the rights and restrictions of the content outside of a premises, and in a data center or headend, by providing requested content to a gateway device within the premises of a user.

The content is, in the exemplary embodiment, provided in a first encryption format and encoded using a first codec, both of which are compatible with the gateway device. In order to provide for a transfer of the content within and outside of the premises network, the gateway is configured to transcrypt the content into an encryption format, and transcode using a codec, that are each compatible with a device which requests the content therefrom. In one implementation, the content is received at the gateway as MPEG-2 content encrypted using Powerkey conditional access (CA) technology. The gateway uses its associated CableCard to decrypt the content, and a transcoder entity to transcode the content to e.g., MEPG-4 (or other appropriate format). The content is then re-encrypted to DRM using a content key obtained from a DRM server and a transcrypter of the gateway. This approach advantageously preserves content rights, and asserts restrictions on use or distribution of content, via, e.g., the user's premises gateway.

In one embodiment, the packager 218 may encrypt the byte range that is identified as a key frame 224 without encrypting the entire media segment, thus reducing the load on the packager as compared to encrypting the entire media segment. The encrypted key frames 224 may then be decrypted by a client device 210.

Alternatively, the media segments 222 may be encrypted by the packager 218 (such as via a DES or AES algorithm via a symmetric or asymmetric key approach) prior to transfer over the network. The media segments 222 may then be decrypted by a client device 210.

In further embodiments, the encoder 202 may also break the encoded output streams 212 into segments 222 for use by the CDN 206 to serve to client devices 210. Furthermore, the encoder 202 in such embodiments generates the manifest files 220 that reference the locations of the segments 222. In a further alternative embodiment, the packager 218 may be utilized for generating the key frame manifest and providing the key frames from an output stream, and the encoder 202 segments and stores various content segments.

In yet another embodiment, the functionalities of the encoder 202, the encryptor 214, and the packager 218 may be integrated into a single apparatus. In a still further embodiment, the encoder 202, encryptor 214, and packager 218 may be combined with the CDN 206 into a single apparatus. Additionally, the encoder 202 or encryptor 214 can, in another variant, feed data directly to the packager 218, or may operate separately from the packager 218. Thus, each of the CDN 206, encoder 202, encryptor 214, and packager 218 may be housed in separate server apparatus, may comprise different processes running on a single server apparatus, or may comprise any number of distributed applications with functionality across any number of apparatus. Each server apparatus may include memory and storage, one or more processors, and interfaces to connect to other components/networks as shown in FIG. 2.

In an exemplary embodiment, a media client of the type discussed in co-owned co-pending U.S. application Ser. No. 14/220,021 filed on Mar. 19, 2014 and entitled "APPARATUS AND METHODS FOR RECORDING A MEDIA STREAM", which is incorporated herein by reference in its entirety may be utilized. The media client replays stored "segmented" media content based on a manifest file 220. In one exemplary embodiment, stored video content streams segments 222 are decompressed for playback based on information stored within an associated data structure (e.g., stream manifest file 220). Examples of information stored within the manifest file 220 may include e.g., encryption keys, supported resolutions, and digital rights information. A video client may further be configured to retrieve additional data to augment the stored segmented video content 222. For instance, a video client with a high resolution (e.g., 1920× 1080) display may consult the stream manifest file 220 for missing and/or replacement segments, when attempting to replay a previously recorded lower resolution recording (e.g., 640×480). By downloading the appropriate segments 222, the video client may support the desired high resolution.

Additional services may utilize the key frames 224 and/or the service of the packager 218 to perform real-time services for a client device 210. For example, the key frames 224 may be used for advertisement insertions. The stored output streams may be processed in parallel by the packager 218 and another server apparatus (e.g., a dedicated image recognition service) in communication with the CDN 206. This parallel processing allows for image recognition within the content, for example, an actor's cameo in a movie (e.g., Tom Cruise's cameo in Tropic Thunder). Parallel processing allows for the generation of in and out points for the times the actor is in the piece of content based on all of the key frames pulled from the packager 218 by the image recognition service. Product placements may also be time stamped via the parallel image recognition processing. Network operators may use advertisement breaks during the presentation of the content or adjacent to the time stamp of the product placement to utilize the product placement time stamp to sell or place the advertisement block. The network operator may sell or place an advertisement for the company whose product has been placed (or, e.g., to a competitor of that company). For example, if a Coke® can is used in a scene of a movie, advertisement blocks could be sold to Coca-Cola® or to Pepsi® during an advertising segment adjacent to the Coke can's appearance in the movie.

The key frames 224 may be used for image insertions. Images may be presented to the user as an alternative to the key frames. For example, an advertiser or network operator may insert alternative images that are shown only during trick play mode operation. During normal play mode, a user is presented with a media segment of the advertisement. During trick play mode operation, the user may instead be presented with graphics touting the product being advertised.

In one embodiment, Search Engine Optimization (SEO) services are performed. These services may be performed by a separate entity, or in the packager 218 (or encoder 202). Image recognition may be performed on the key frames or individual key frames to identify faces, products, or corporate logos. The service may pull key frames from the packager 218 and perform such recognition in real-time for a user or may perform such recognition any time following encoding or packaging. The faces of actors/products/or logos may be identified in the key frames and this data (e.g., time stamps of the locations, listings of the products/logos/ actors) may be recorded within the asset itself (e.g., in an encoded file), or in a file containing meta-data. For example, a user may search for all of the Brad Pitt scenes in Ocean's Eleven or all movie scenes containing Brad Pitt generally. The search may query the metadata that was gathered via image recognition of the key frames or may perform a search through the key frames of an asset in real time based on the search criteria of a user. The same image recognition may occur for corporate logos in movies, for example finding all of the scenes where the Coca-Cola logo is displayed. Advertising may be sold to these corporations whose logos/ products appear (or their competitors) in advertising spots adjacent to (e.g., before or after) these logo/product appearances which may occur in real-time for real-time advertisement insertion. Furthermore, advertisements or alerts may be displayed on screen to a user watching content when a product or logo appears allowing the user to interact with that element.

Processing of the audio content corresponding to key frames may also be performed to identify audio content of interest e.g., quotable dialogue, music, etc. for advertisement insertions and SEO services. An advertisement or SEO server may pull key frames from the packager 218 and perform audio processing of the key frames in real-time for a user or may perform such processing any time following encoding or packaging. Audio content of interest may be identified in the key frames and this data (e.g., time stamps of the locations, listings of the audio content) may be recorded within the asset itself (e.g., in an encoded file), or in a file containing meta-data. For example, a user may search for all scenes with audio content relating to particular genre of music or a specific spoken word or phrase. The search may query the metadata that was gathered via audio processing of the key frames or may perform a search through the audio content of the key frames of an asset in real time based on the search criteria of a user. Advertising may be sold to entities associated with the audio content (or their competitors) in advertising spots adjacent to (e.g., before or after) the key frames corresponding to the audio content, which may occur in real-time for real-time advertisement insertion. Furthermore, advertisements or alerts may be displayed on screen to a user watching video content when particular audio content is played allowing the user to interact with that element.

In a further embodiment, Quality Control services are performed. These services may be performed by a separate entity, or in the packager 218 (or encoder 202). The entity may check via the key frames whether there are any all black frames or groups of black frames in the content stream. In a variant, all black frames or groups of black frames within the content stream raises a flag that a problem has occurred at the encoder 202, at the packager 218, or another portion of the network (e.g., CDN 206). When such an error is found the error may be (i) logged and/or (ii) all or parts of the source content file may be re-encoded (via encoder 202). These checks may be done in real-time (or faster than real-time) or just prior to a client's request on forward video and corrections may be made to the content/images in real-time to improve the user experience.

In a further embodiment, box art (e.g. display artwork) may be scrubbed from key frames of an asset. These key frames may be used in an electronic programming guide (EPG) particularly when another pre-selected image is not made available. In a variant, the key frames (or a portion thereof) may be displayed in the EPG itself to potential viewers. Real-time generated box art may be used in search results as well. Default time codes may be requested from the packager 218 for particular key frames. Image recognition may be performed on the key frame to determine if the key frame is suitable for all audiences (e.g., to determine there is no adult content) or to determine if a main character (or a particular objector logo) is in the box art. Text, e.g., the title of the asset, may be written in real-time on the key frame or the key frame may be manipulated (e.g., aspect ratio changed) before presentation to the user. In a further variant, the box art also may be curated and chosen using a key frame extracted from the output stream. As will be readily understood by those of ordinary skill in the art given the present disclosure, virtually any use of key frames may utilize embodiments of the present disclosure.

ABR Streams—

Figure 3:
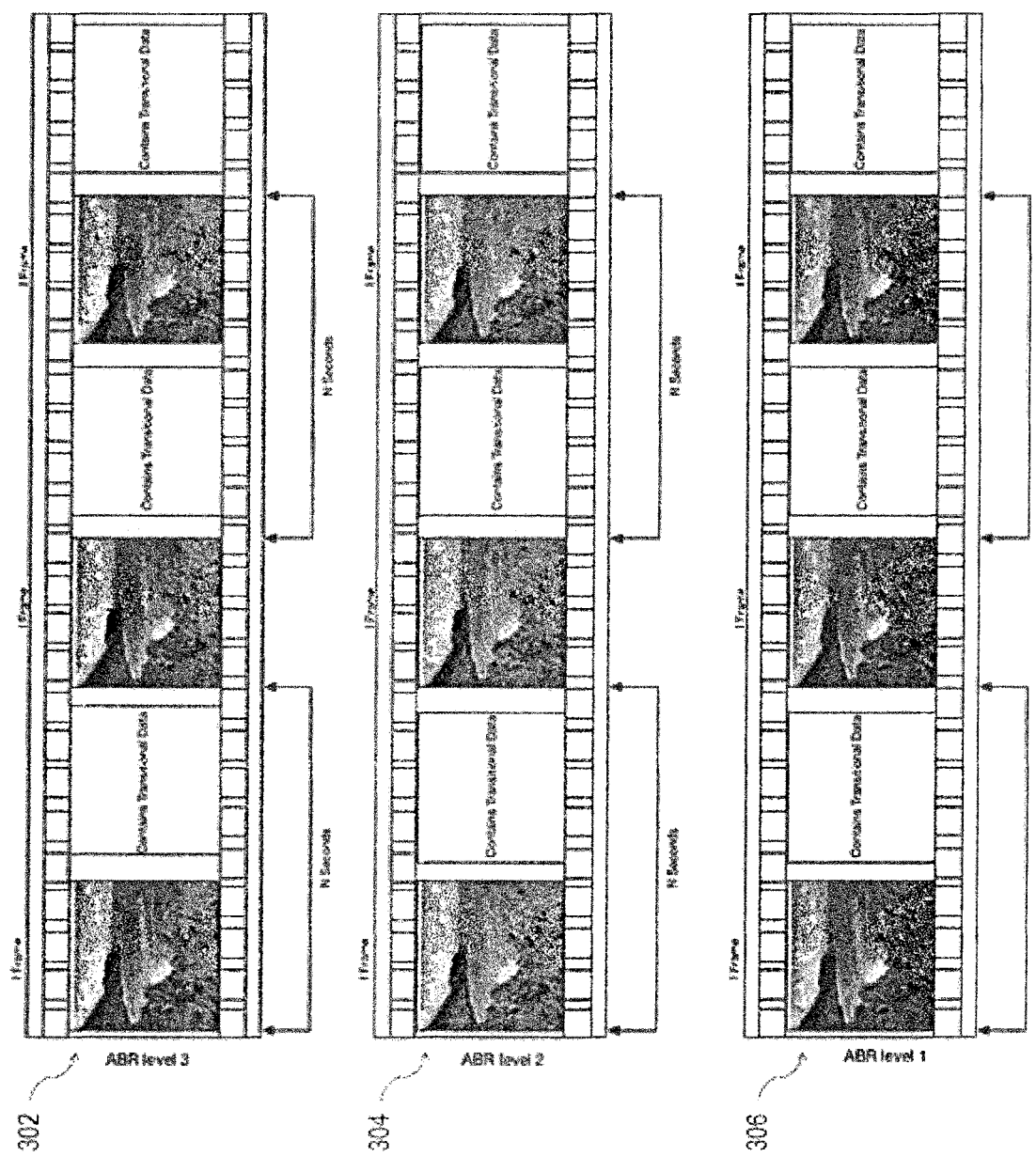
FIG. 3 is a graphical representation of various stream types useful in conjunction with various principles described herein.

Referring now to FIG. 3, a diagram illustrating various stream types are shown. Streams 302, 304, and 306 illustrate three different adaptive bitrate (ABR) level streams. Each ABR level stream 302, 304, and 306 comprise key frames (e.g., I-frames). Between key frames are transitional frames containing transitional data. As shown in FIG. 3, each of the key frames is spaced N seconds apart for clarity, although it is appreciated that other embodiments may have irregularly spaced key frames (based on I-frame compression, etc.) The spacing of key frames may be as little or as much as desired for the particular application; however, having longer chunks may coincide with less ability to change ABR level. This is useful when using ABR as the content is broken up into standardized (i.e., equal time) segments and so different ABR level streams 302, 304, or 306 may be selected for each segment and the timing of key frames within segments will line up. As will be understood by those of ordinary skill, having more segments may coincide with increased overall file sizes (due to more key frames) and greater file management. Segments are, in one embodiment, broken up along key frame boundaries; segments may comprise multiple key frames (and transitional frames) or only a single key frame. This depends on the length of the segment and the level of compression of the content. In an alternative embodiment, segments are not broken up at key frame boundaries.

Each ABR level stream 302, 304, and 306 is packaged as a separate stream file (for example an MPEG 4 stream file). Alternatively, all of the streams 302, 304, 306 can be packaged together in a single file allowing the CDN 206 to manage fewer files. ABR streams 302, 304, and 306 may contain or be associated with audio tracks.

When requested by a client device 210 or CDN 206, the packager 218 decodes, decrypts, and provides the key frames to the requesting device. The key frames may be full size, or resized or reformatted from the original stream. That is, the resolution, compression, aspect ratio (e.g., cutting out or center punching the key frames or adding black bars), etc. may be changed depending on the request by the client device 210 or CDN 206. Furthermore, provided key frames may have filters or effects applied, or closed captioning information or other data can be provided with the key frames. Thus, key frames may be provided from the output stream on the fly as they are requested by the device. This solution saves disk space, requires less file management, and is scalable for the many different end user devices that would utilize the key frames.

Methods—

As referenced above, various embodiments of the present disclosure are directed to schemes for the creation, storage, and playback of content streams.

Referring now to FIG. 4a, one embodiment of a method 400 for encoding a content stream is disclosed. At step 402 of the method 400, the encoder 202 receives inputs of a source file 204. The encoder 202 and encrypter 214 receives encoding and encrypting requirements of the CDN 206 and/or client devices 210. The encoder 202, at step 406, encodes the source file 204 into a plurality of encoding types (i.e., creates multiple versions of the source file each having a different encoding type). These may include various resolutions and formats for use by a variety of client devices; the generated versions of the source file may be used for ABR streaming. As discussed above, the encoded stream 212 comprises key frames separated by null frames. At step 408, the encoded streams 212 are encrypted by the encrypter 214 in accordance with the encrypting requirements.

Referring now to FIG. 4b, one embodiment of a method 420 for operating a content delivery network is disclosed. At step 422 of the method 420, a CDN 206 receives a request for content from a client device 210. At step 424, the CDN 206 parses the request and forwards the request to a packager 218. Along with the request for content, the CDN 206 may also send device capabilities of the client device 210 including, but not limited to, the device type, manufacturer, model number, serial number, current display resolution, file formats accepted, codecs that are displayable, bit rates that are playable, and streaming technologies accepted. Furthermore, in the case of a gateway device, the gateway device may send the foregoing properties of the display equipment 210 (e.g., CPE, television, smart television, computer, tablet, phone, etc) or some or all of the devices 210 that the gateway device serves. These device capabilities may be used to format the streams for later display on the end user devices 210.

In one embodiment, a user makes a request from a user device that passes the request through a home gateway device as disclosed in co-owned, U.S. patent application Ser. No. 11/818,236 entitled "PREMISES GATEWAY APPARATUS AND METHODS FOR USE IN A CONTENT-BASED NETWORK" filed on Jun. 13, 2007, and issued as U.S. Pat. No. 7,954,131 on May 31, 2011, which is incorporated herein by reference in its entirety. In this embodiment, the home gateway device passes the user device details and the request for content to the CDN 206 (which can be passed to the packager 218).

In an alternative embodiment, the CDN 206 predicts that content will be requested at a future time period by a client device based on, e.g., previous user requests or requests of content from similarly situated users (e.g., users who are demographically or psychographically similar). For example, content may be selected to align with user preferences as discussed in co-owned U.S. application Ser. No. 12/414,576 filed on Mar. 30, 2009 entitled "RECOMMENDATION ENGINE APPARATUS AND METHODS", and issued as U.S. Pat. No. 9,215,423 on Dec. 15, 2015, which is incorporated herein by reference in its entirety. Alternatively, the user may subscribe to a particular piece of content. In such embodiments, the CDN 206, during a period of low network activity (e.g., late night) may request that the packager 218 generate segments 222 and a manifest file 220 and have the user device download such content to preload the content at the user device for later viewing. In a further alternative, the CDN 206 preloads a content stream file, e.g., the highest ABR stream, or a plurality of content stream files on the home gateway device at the user premises (with appropriate digital rights management (DRM)) and have the packager 218 running at (or co-located with) the home gateway device generate content segments 222 and manifest files 220 for a single user device or a plurality of user devices 210 (e.g., a high definition television and a user's cellular telephone) in real-time. In a further alternative, the CDN 206 preloads a source stream 204 and has the gateway device encode the different ABR streams 212.

In an alternative embodiment, a virtual channel is streamed to the client device 210 via CDN 206. The channel may comprise content that is selected for the user by the CDN 206 or the client device 210. The virtual channel may utilize content encoded by the encoder 202 and packaged by the packager 218. For example, the content on the virtual channel may be targeted content as discussed in co-owned co-pending U.S. application Ser. No. 12/414,554 filed on Mar. 30, 2009 and entitled "PERSONAL MEDIA CHANNEL APPARATUS AND METHODS", which is incorporated herein by reference in its entirety.

At step 426, the CDN 206 receives a response to the request for content from the packager 218. The packager 218 provides a manifest file 220, segments of a content file 222, and/or key frames 224. At step 428, one or more of the provided files 220, 222, and/or 224 are sent to the user device 210.

Referring now to FIG. 4c, one embodiment of the method 440 of operating the packager 218 is disclosed. At step 442, the packager 218 receives a request for content from a CDN 206 on behalf of a user. At step 444, the packager 218 determines the user requirements from the request, these include the content that is requested and the format for the content (e.g., resolution, bit rate, etc.). At step 446, a manifest file 220 and program segments 222 are generated. In an embodiment, the packager 218 determines that a user requests a number of key frames via a trick play mode request. At step 448, the packager 218 provides the user a manifest file 220 with the addresses for the program segments 222 and/or the bytes of the key frames 224 in the program segments 222. Alternatively, the packager 218 sends the program segments 222 and/or the key frames 224 to the client device directly (or via the CDN 206).

While the foregoing discussion is primarily presented within the context of on-the-fly generation of master manifests and key frame manifests, the various principles of the present disclosure may be adapted with equivalent success to cached embodiments. For example, in one exemplary embodiment of the present disclosure, the packager generates key frame manifests for caching (and faster provision) of anticipated trick play mode requests. For example, the packager may generate a number of key frame manifests according to a standard set of configurations which are supported by the network. In other variants, the packager may consider historic requests for media and/or future predictions of demand to generate a number of key frame manifests which are likely to have high demand. Still other cached key frame manifests may be required for specific legal or regulatory requirements (e.g., public services, etc.) Common examples of key frame manifest configurations accommodate various configurations of I-frame granularity, compression rates, codecs, etc. The key frame manifest can be provided to a client device upon user registration in anticipation of trick play mode operation.

In other embodiments of the present disclosure, the packager generates and caches one (or a limited number of) primary key frames which are delivered when requested by any client device; thereby requiring the client device to transcode the key frames in accordance with its own requirements. In some variants, the primary key frames are generated at high quality (each client device transcodes the file down to its native capabilities, maximizing the preserved fidelity). In other variants, the primary key frames are generated and stored at a low quality (supporting many if not all client devices, but requiring higher capability players to accept low quality resolution). In yet other variants, the primary key frames are generated and stored for all available qualities.

Referring now to FIG. 4d, one embodiment of the method 460 of operating a client device 210 is disclosed. At step 462, the client device 210 sends device specifications and/or network conditions to the CDN 206. The device specifications may include the device type, encryption options and settings, device aspect ratio, and supported codecs and file types. Network conditions may include current throughput, predicted available bandwidth, network latency. For example, latency may be determined as discussed in co-owned U.S. Pat. No. 8,930,979 and entitled "APPARATUS AND METHODS FOR IDENTIFYING AND CHARACTERIZING LATENCY IN A CONTENT DELIVERY NETWORK", which is incorporated herein by reference in its entirety. Alternatively (or additionally), the device may send an acceptable bitrate for the content stream based on network conditions. For example, a user could detect throughput of 3 Mbps (Megabits per second) and request a bitrate of 2.25 Mbps (75% of the detected throughput). The proportion of available bandwidth can be based on other current bandwidth uses, predicted bandwidth uses, or the number (or ratio) of retransmission requests sent.

At step 464, a user enters a trick play mode command (e.g., fast forward, rewind, pause, or random seek), and the client device 210 requests key frames 224 based on the trick play mode request. The requested key frames 224 may include any key frame within a segment. For example, the requested key frame may include the first frame, the last frame, or any frame between the first and last frame of a content segment. At step 466, the client device 210 receives the key frames 224 or a manifest file 220 listing the bytes of the key frames 224 within the segment file. In the later embodiment, the client device 210 then requests the bytes of the key frames 224 from the CDN 206 based on the information listed in the manifest file 220.

As a brief aside, artisans of ordinary skill in the related arts will readily appreciate that certain types of media may have key frame manifests which are unwieldy in size. For example, consider movie media with an I-frame every two (2) to ten (10) seconds of video; for a two (2) hour movie, this represents approximately 1,000 I-frames. Consequently, various embodiments of the present disclosure envision intelligent solutions for managing key frame manifests.

In one implementation, the manifest file 220 has a fixed number of content segment entries which are sequentially ordered. For example, typical playlists consist of ten (10) six-second (6s) segments of video content, representing a minute of video. As each segment is played, a replacement segment is added (similar to a First-In-First-Out (FIFO) buffer). Other implementations may expand or contract or have non-sequential ordering according to e.g., various network considerations. For example, the manifest may dynamically adjust length based on available servers, available bandwidth, etc. In other cases, the manifest may have a first section (e.g., for program content), and a second lower priority section for background loading (e.g., for advertisements). For streams which support multiple different technologies and/or resolutions, the manifest may be "striped" or split into portions, each stripe or portion associated with a particular technology or resolution, etc. Furthermore, the manifest 220 may list a fixed number of key frame locations which are sequentially ordered. For example, a playlist may contain 20 key frames of video content representing two minutes of key frames (i.e., one key frame per six seconds). Such key frames 224 represent one forward minute and one rewind minute of key frames presented during trick play mode operation.

In some embodiments, the key frame manifest is delivered in a sparse format where a reduced number of key frames selected from the entire manifest are provided. For example, certain key frames may be tagged as related to significant portions of the media (e.g., scene changes, movie plot points, etc.). In other examples, every Nth key frame is provided. In still other examples, the key frame associated with every Nth time interval (e.g., 2 minute chunks of media) are provided. Still other schemes may provide key frames that are most frequently requested, centered on last viewed scenes, historically preferred, selected or curated (via an intelligent algorithm, crowd sourcing, etc.)

In some cases, sparse format delivery may be adjusted according to various user preferences, client device capabilities, and/or network conditions. For example, a user may elect to browse through a larger number of key frames to find a precise moment in the manifest; alternatively, a user may prefer longer gaps, which are suitable for casual watching. In other examples, the network may limit key frame manifest size so as to ensure user experience and reduce network congestion on overhead, etc. In still other examples, client devices may be better suited to more/less sparse delivery; for example, client devices that rely on button presses generally detract from the user experience when selecting a key frame from a large manifest, whereas more sophisticated control mechanisms (e.g., scroll wheels, slider bars, etc.) may readily accommodate large manifests.

At step 468, the client device 210 displays the key frames 224 to the user while the user browses the trick play mode operation. For example, when a user enters the rewind command a minute of rewind key frames (in reverse) are loaded into a buffer and displayed for the user while the user remains in rewind mode. The display of key frames follows the current location in the piece of content. In an embodiment, the display of key frames accelerates the longer the command is executed or upon multiple button presses, or remain the same speed throughout. In another example embodiment, when a user enters the fast forward command, a minute of forward key frames are loaded into a buffer and displayed for the user while the user remains in fast forward mode. The display of key frames follows the current location in the piece of content. In an embodiment, the display of key frames accelerates the longer the command is executed or upon multiple button presses, or remain the same speed throughout.

In one exemplary embodiment, the user seeks at a random location on a location bar in a piece of content, if a key frame 224 needed is listed in the current manifest file 220, the key frame 224 can be displayed. When the key frame 224 corresponds to a portion of video content that is outside the current manifest file 220, the user device 210 requests a new manifest file 220 listing the needed key frames 224 (and the packager 218 generates the new manifest file 220 from the output stream 212). In an alternative embodiment, the manifest file 220 lists all key frames in the content and the client device 210 downloads them when needed in response to user action.

Once the user has selected a key frame to play, the client device can request the media associated with the key frame. In some embodiments, the CDN can spool the media frames from the key frame (inclusive) onward. For example, some implementations may deliver the I-frame (appropriately transcoded for the client device, and network considerations) corresponding to the key frame (which may have been at a lower resolution). In other embodiments, the CDN can buffer the media frames immediately after the key frame (i.e., excluding the key frame) in order to quickly deliver the P-Frame or B-Frame immediately following the key frame (i.e., I-Frame); such embodiments reduce network overhead and can enable seamless immediate full resolution playback.

Figure 4E:
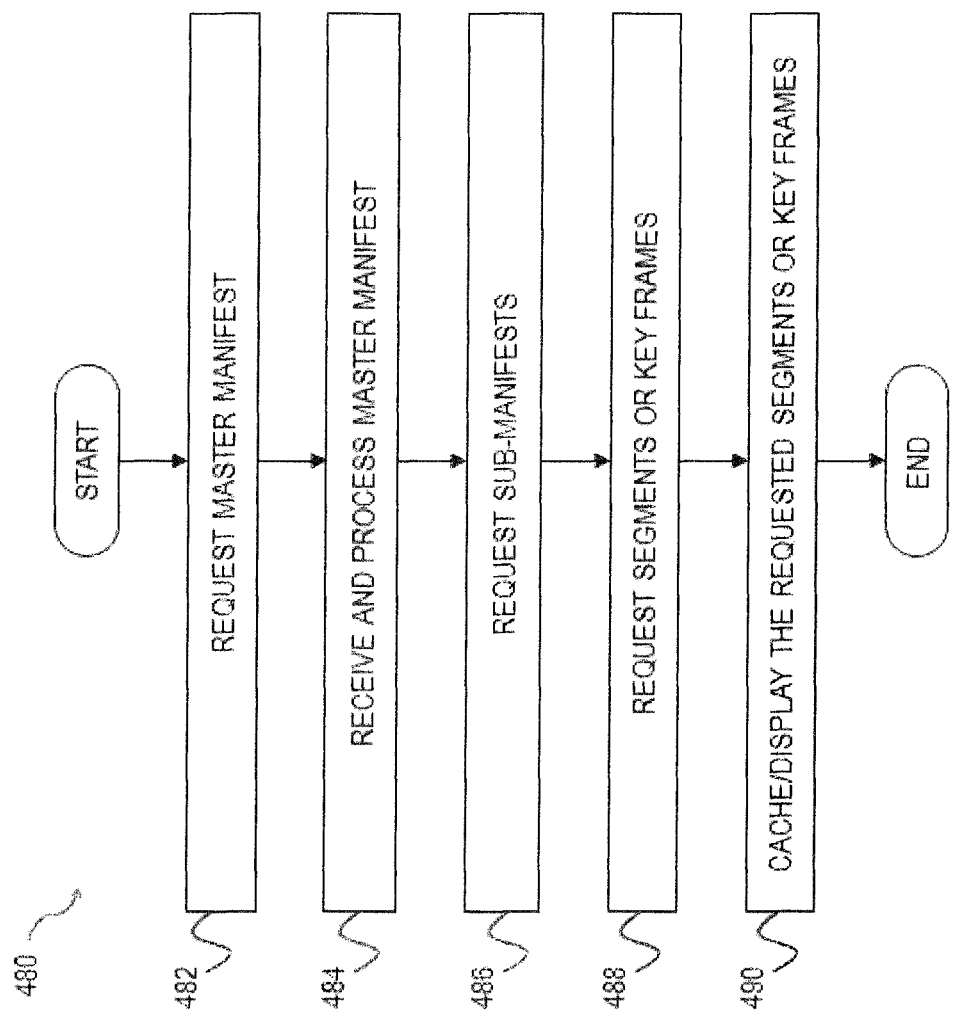
FIG. 4e is a logical flow diagram representing another embodiment of a method for operating a consumer premises equipment (CPE).

Referring now to FIG. 4e, another embodiment of a method 480 of operating a client device 210 is disclosed.

At step 482, the client device 210 receives a request from a user for content. In response, the client device 210 generates a request for a master manifest file from the CDN 206. In return, the CDN 206 will send the client device 210 a copy of the master manifest file.

At step 484, the client device 210 receives the master manifest file from the CDN 206 and processes the master manifest file.

At step 486, the client device 210 requests sub-manifests from the CDN 210 based on the master manifest file received. These sub-manifests may be generated by the packager 218 upon registration of the content, upon the first request by any client device and then cached by the CDN 210, or generated in real-time. The sub-manifest files comprise addresses of segments 222 and byte information for key frames 224 within the segments 222. The segments 222 listed may include a variety of segments 222 for use on a variety of devices or with different bit rates/file sizes for use with adaptive bitrate (ABR) streaming. The CDN 210 will then send the requested sub-manifest files to the client device 210.

At step 488, the client 210 uses the sub-manifest files to request content segments 222 and/or key frames 224 from the CDN 206 based on a user request. For example, when a user utilized the rewind function, the client device 210 requests a number of key frames (in reverse) for display to the user during the trick play mode operation. Similarly, with fast forward functionality, the client device 210 requests a number of key frames (going forward) for display to the user. During random seek operation, the client device 210 may request key frames both before and after the time of the content.

When the CDN 206 receives a request for a segment or key frame, the CDN 206 will serve the segment 222 or key frame 224 immediately if it is cached. If the segment 222 or key frame 224 is not cached, the CDN 206 calls the packager 218 and requests the packager 218 generate, package, and process (including decrypting) the content segment 222 or key frame 224. The CDN 210 then caches and serves the requested content segment 222 or key frame 224 to the client device 210.

At step 490, the client device 210, upon receipt of the requested segment 222 and/or key frame 224 may display the received segment 222 or key frame 224 or cache the segment 222 or key frame 224 for later display.

When the asset expires at the CDN 206, the cached segments and key frames are removed and the pre-generated manifests by the packager 218 may be removed. If a request is made for these files after removal, the client device 210 requesting the files will receive an error that the file is not found (e.g. a 404 error) or the respective file will be generated by the packager 218 and served by the CDN 206, in one embodiment.

Preview-Enabled Client Device

Figure 5:
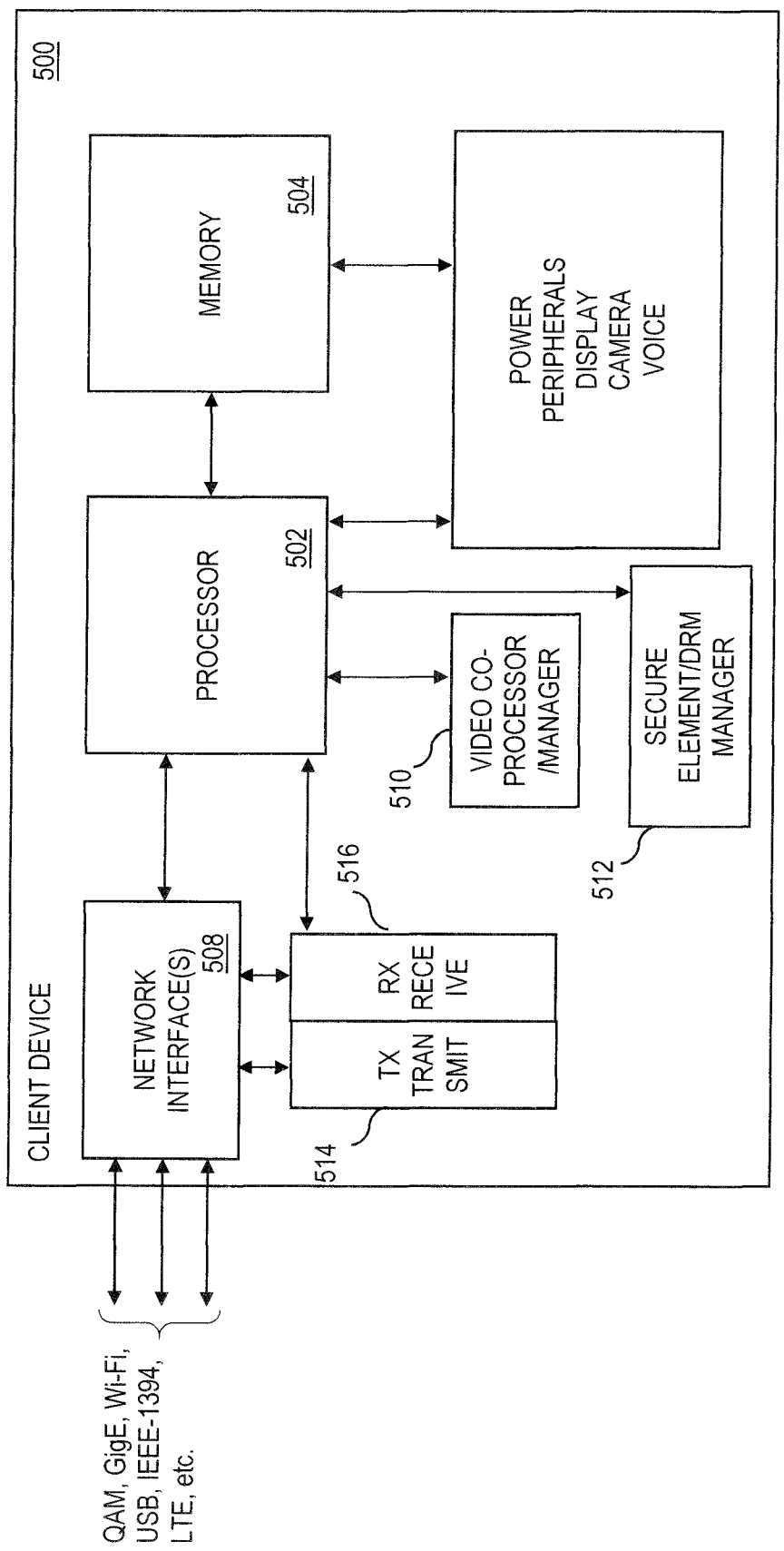
FIG. 5 is a functional block diagram of an exemplary embodiment of a preview-enabled client device apparatus according to the present disclosure.

FIG. 5 illustrates an exemplary client device 500 according to the present disclosure. As shown, the client device 500 includes, inter alia, a processor subsystem 502, a memory module 504, one or more radio frequency (RF) network interfaces 508, a transmit module 514, video co-processor and manager 510, a secure element (SE) and DRM manager 512, and a receive module 516.

In one exemplary embodiment, the processor 502 may include one or more of a digital signal processor, microprocessor, field-programmable gate array, or plurality of processing components mounted on one or more substrates (e.g., printed circuit board). The processor subsystem 502 may also comprise an internal cache memory. The processor subsystem is in communication with a memory subsystem 504, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem 502 is configured to execute at least one computer program stored in memory 504 (e.g., a non-transitory computer readable storage medium). A video co-processor 510 and SE/DRM Manager 512 are also in data communication with the processor subsystem 502, and collectively the foregoing components include a plurality of computer programs/firmware configured to perform the functions described supra, e.g., decryption, manifest unpacking, decode, preview/trick-mode image display, as well as various assorted functions useful for and typical in consumer electronics including baseband management (e.g., transmit and receive functions via the baseband processor and associated TX and RX modules 514, 516.

In one or more embodiments, the video co-processor/manager and SE/DRM manager each include an internal cache or memory configured to hold data associated with one or more functions (e.g., decoded video frames, decryption keys, etc.). In some embodiments, application program interfaces (APIs) such as those included in an MSO-provided mobile application or those natively available on the client device 500 (e.g., as part of the decode/display computer program noted supra, or exclusively internal to the manager modules 510, 512) may also reside in the internal cache(s), or other memory 504.

In one embodiment, the radio frequency interface 508 is configured to transact one or more network address packets with other networked devices according to a network protocol, e.g., RF QAMs in an HFC network, a MoCA premises network interface, OFDM carriers in a Wi-Fi or LTE network, and so forth.

Network addressing may provide each node of a network with an address that is unique to that network; the address can be used to communicate (directly via peer-to-peer communications, or indirectly via a series of "hops") with the corresponding device. In more complex networks, multiple layers of indirection may be used to assist in address exhaustion (e.g., one address is logically divided into another range of network addresses). Common examples of network routing protocols include for example: Internet Protocol (IP), Internetwork Packet Exchange (IPX), and OSI-based network technologies (e.g., Asynchronous Transfer Mode (ATM), Synchronous Optical Networking (SONET), Synchronous Digital Hierarchy (SDH), Frame Relay).

A radio/modem subsystem of the client device 500 comprises a TX transmit module 514 and RX receive module 516, which communicate with the RF network interface 508. The network interface 508 generally incorporates an assembly of filters, low noise amplifiers (LNAs), power amplifiers (PAs), and antenna assemblies that are configured to transmit a modulated waveform via an air interface. As shown, the radio/modem subsystem may be configured to support MIMO (multiple input, multiple output) antenna technology in which multiple antennas are used to transmit and receive signaling. With MIMO, multiple independent data streams can be transmitted in parallel using the same time-frequency resource. To distinguish the data streams sharing this same time-frequency resource, spatial division multiplexing is applied. Those of ordinary skill in the related arts will readily appreciate that SISO (single in, single out), SIMO (single in, multiple out), and MISO (multiple in, single out) antenna schemes may be substituted with equivalent success.

The client apparatus 500 of the present embodiment comprises a mobile consumer electronics device, such as, but not limited to mobile devices such as handheld computers, PDAs, personal media devices (PMDs), smartphones, tablets, and "phablets," and personal computers (PCs), and minicomputers, whether desktop, laptop, or otherwise. Artisans of ordinary skill will readily appreciate that consumer electronics devices may incorporate various other assorted components necessary to support typical functions of such devices, including power modules, peripherals modules, display modules (associated with, e.g., a display screen, UI, GUI), camera modules, voice codec modules, etc. Moreover, the methods and apparatus described herein may also readily be adapted to e.g., other types of client devices/CPE including e.g., Smart TVs, digital set-top boxes (DSTBs), etc.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Computer readable apparatus comprising a non-transitory storage medium, the non-transitory storage medium comprising at least one computer program having a plurality of instructions, the plurality of instructions configured to, when executed on a digital processing apparatus, cause a computerized packager apparatus to:
   receive digitally rendered video data;
   generate a manifest data structure for the digitally rendered video data;
   provide the manifest data structure for delivery to a computerized client device;
   receive data representative of a request for at least one key frame, the request originating from the computerized client device;
   based at least on the request, generate a portion of the digitally rendered video data corresponding to the at least one key frame, the generation of the portion comprising:
      retrieval of a plurality of bytes of the digitally rendered video data, individual ones of the plurality of bytes respectively preceding to the at least one key frame to enable decryption of the at least one key frame;
      decryption of the at least one key frame;
      extraction of one or more bytes corresponding to the at least one key frame from the decrypted at least one key frame; and
      generation of the portion from the extracted one or more bytes corresponding to the at least one key frame; and
   cause transmission of the portion of the digitally rendered video data to the computerized client device.

2. The computer readable apparatus of claim 1, wherein the data representative of the request comprises a byte offset and a number of bytes of the key frame, and the generation of the portion of the digitally rendered video data comprises generation of the portion of the digitally rendered video data referenced by the byte offset and the number of bytes included in the data representative of the request for the at least one key frame.

3. The computer readable apparatus of claim 1, wherein the plurality of instructions are further configured to, when executed on the digital processing apparatus, cause the computerized packager apparatus to:
   generate data indicative of a future time period that the digitally rendered video data is predicted to be requested by the computerized client device; and
   based on the generated data, cause the computerized client device to preload at least the portion of the digitally rendered video data prior to a request for at least the portion of the digitally rendered video data by the computerized client device.

4. The computer readable apparatus of claim 3, wherein the generation of the data indicative of the future time period is based at least on data representative of previous requests for digitally rendered content from users who have one or more demographic or psychographic parameters in common with a user of the computerized client device.

5. The computer readable apparatus of claim 1, wherein the causation of transmission of the portion of the digitally rendered video data to the computerized client device comprises causation of transmission of the portion of the digitally rendered video data to the computerized client device over a virtual channel streamed to the computerized client device, the virtual channel streaming digitally rendered content targeted to a user associated with the computerized client device, the digitally rendered content targeted based at least on one or more user preferences.

6. The computer readable apparatus of claim 1, wherein the plurality of instructions are further configured to, when executed by the digital processing apparatus, cause the computerized packager apparatus to:
   cause encoding the generated portion of the digitally rendered video data, the encoding configured based at least on one or more capabilities of the computerized client device, at least a portion of the encoding performed prior to the transmission of the portion of the digitally rendered video data to the computerized client device.

7. The computer readable apparatus of claim 1, wherein the plurality of instructions are further configured to, when executed by the digital processing apparatus, cause the computerized packager apparatus to:
   cause modification of at least one of resolution, bit rate, or aspect ratio of the generated portion of the digitally rendered video data based at least on capabilities of the computerized client device prior to the transmission of the portion of the digitally rendered video data to the computerized client device.

8. The computer readable apparatus of claim 1, wherein the receipt of the digitally rendered video data comprises receipt of a digitally rendered video file configured for use with adaptive bitrate streaming, the digitally rendered video file comprising an encrypted digitally rendered video file comprising a plurality of key frames, at least two of the plurality of key frames separated by one or more transitional frames, and the each of the plurality of the key frames is spaced apart at a prescribed interval of time.

9. The computer readable apparatus of claim 1, wherein the receipt of the data representative of the request for the key frame comprises receipt of an acceptable bitrate for the portion of the digitally rendered video data based on one or more network conditions detected by the computerized client device.

10. Computerized packager apparatus, comprising:
first data interface apparatus configured to communicate with a network;
digital processing apparatus in data communication with the first data interface apparatus; and
storage apparatus in data communication with the first data interface apparatus and the digital processing apparatus and comprising at least one computer program, the at least one computer program comprising a plurality of instructions which are configured to, when executed by the digital processing apparatus, cause the computerized packager apparatus to:
receive digitally rendered video data for use with adaptive bitrate streaming, the digitally rendered video data comprising one or more key frames separated by at least one or more transitional frames;
generate one or more key frame files from the digitally rendered video data, the one or more key frame files comprising a consecutive sequence of key frames, the generation of the one or more key frame files comprising:
for each key frame of the consecutive sequence of key frames, (i) retrieval of one or more bytes of the digitally rendered video data preceding and one or more bytes corresponding to the key frame to enable access to the key frame, (ii) decryption of the retrieved one or more bytes, and (iii) extraction of one or more bytes corresponding to the key frame from the decrypted one or more bytes; and
generation of the one or more key frame files from the extracted one or more bytes corresponding to the key frame;
generate a key frame manifest data structure for the one or more key frame files, the key frame manifest data structure comprising byte information for each of the key frames of the one or more key frame files;
provide the key frame manifest data structure for delivery to a computerized client device;
based at least on data relating to a request for a trick play mode operation, the data relating to the request comprising information indicative of a key frame corresponding to a current frame being displayed by the computerized client device, cause transmission of one or more portions of the one or more key frame files to the computerized client device, the one or more portions comprising the indicated key frame and a plurality of key frames being at least one of immediately preceding, or immediately following, the indicated key frame.

11. The computerized packager apparatus of claim 10, wherein:
the digitally rendered video data comprises media data; and
the plurality of instructions are further configured to, when executed by the digital processing apparatus, cause the computerized packager apparatus to:
encrypt the one or more portions of the one or more key frame files to maintain a protection applied to portions of the media data included in the one or more key frame files.

12. The computerized packager apparatus of claim 10, wherein the transmission of the one or more portions of the one or more key frame files to the computerized client device comprises transmission of encrypted one or more portions of the one more key frame files to the computerized client device.

13. The computerized packager apparatus of claim 10, wherein:
the one or more portions of the one or more key frame files comprise one or more encrypted portions of the one or more key frame files; and
the plurality of instructions are further configured to, when executed by the digital processing apparatus, cause the computerized packager apparatus to:
decrypt the one or more encrypted portions of the one or more key frame files prior to the transmission thereof to the computerized client device.

14. The computerized packager apparatus of claim 10, wherein the plurality of instructions are further configured to, when executed by the digital processing apparatus, cause the computerized packager apparatus to:
segment the digitally rendered video data into a plurality of portions; and
generate a master manifest data structure comprising a plurality of addresses corresponding to the plurality of portions of the segmented digitally rendered video data.

15. A computerized method for providing video data for display, the computerized method comprising:
receiving digitally rendered video data, the digitally rendered video data comprising two or more key frames separated by one or more transitional frames;
generating a plurality of video segments from the digitally rendered video data, each of the plurality of video segments comprising only one key frame, the generating of the plurality of video segments from the digitally rendered video data comprising generating the plurality of video segments having a length that is less than or equal to a key frame period of the video file;
encrypting the plurality of video segments;
generating key frame manifest data for the digitally rendered video data, the key frame manifest data comprising (i) address data for the encrypted plurality of video segments, and (ii) byte information for the two or more key frames of the encrypted plurality of video segments; and
providing the key frame manifest data for delivery to a computerized client device.

16. The computerized method of claim 15, further comprising receiving data representative of a request for one or more key frames, the request originating from the computerized client device and part of a trick play mode operation.

17. The computerized method of claim 15, wherein one or more of the plurality of video segments each comprises one or more transitional frames preceding the only one key frame of the video segment.

18. The computerized method of claim 15, further comprising:
based at least on receipt of data representative of a request for a key frame, retrieving an encrypted video segment referenced by an address included in the data representative of the request;
decrypting the retrieved encrypted video segment; and extracting bytes from the decrypted video segment, the extracted bytes corresponding to byte information included in the data representative of the request for the key frame.

19. The computerized method of claim 15, wherein the receiving of the digitally rendered video data comprises receiving encoded digitally rendered video data, the encoded digitally rendered video data encoded into a plurality of encoding types based on one or more policies of at least one of the computerized client device or a content delivery network associated therewith.

20. The computerized method of claim 15, wherein the receiving of the digitally rendered video data comprises receiving a video file configured for use with adaptive bitrate streaming.

* * * * *